United States Patent
Shimakawa et al.

(10) Patent No.: US 7,775,618 B2
(45) Date of Patent: Aug. 17, 2010

(54) RECORDING APPARATUS AND DATA PROCESSING METHOD

(75) Inventors: Masaharu Shimakawa, Kawasaki (JP); Daigoro Kanematsu, Yokohama (JP); Rie Takekoshi, Kawasaki (JP); Mitsutoshi Nagamura, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 10/579,515

(22) PCT Filed: Nov. 12, 2004

(86) PCT No.: PCT/JP2004/017229
§ 371 (c)(1),
(2), (4) Date: May 12, 2006

(87) PCT Pub. No.: WO2005/047003
PCT Pub. Date: May 26, 2005

(65) Prior Publication Data
US 2007/0126766 A1 Jun. 7, 2007

(30) Foreign Application Priority Data
Nov. 13, 2003 (JP) .............................. 2003-383367
Nov. 5, 2004 (JP) .............................. 2004-322258

(51) Int. Cl.
*B41J 2/205* (2006.01)
(52) U.S. Cl. ......................................... 347/15; 347/43
(58) Field of Classification Search .................. 347/15, 347/43
See application file for complete search history.

(56) References Cited

U.S. PATENT DOCUMENTS

| | | | |
|---|---|---|---|
| 5,798,776 A | | 8/1998 | Uchiyama et al. |
| 5,828,396 A | * | 10/1998 | Seto et al. .................... 347/111 |
| 6,084,604 A | * | 7/2000 | Moriyama et al. ............. 347/15 |
| 6,328,403 B1 | * | 12/2001 | Iwasaki et al. ................ 347/15 |
| 7,121,641 B2 | | 10/2006 | Nitta et al. |

FOREIGN PATENT DOCUMENTS

| | | |
|---|---|---|
| EP | 1-191784 | 3/2002 |
| JP | 2002-79695 | 3/2002 |
| JP | 2002-307671 | 10/2002 |

* cited by examiner

Primary Examiner—Matthew Luu
Assistant Examiner—Justin Seo
(74) Attorney, Agent, or Firm—Fitzpatrick, Cella, Harper & Scinto

(57) ABSTRACT

An object of the present invention is to provide a recording apparatus in which the occurrence of smearing and bleeding in the borders between black and color pixels can be reduced, and in which high-quality black characters and black images can be recorded. Black adjacent pixels, in which pixels adjacent to their periphery are black pixels, and color adjacent pixels, which are composed of pixels wherein pixels adjacent to their periphery are recorded with colored ink, are extracted from each pixels constituting a black image, and color ink data is created so that color ink is applied according to a certain ratio for the black adjacent pixels or color adjacent pixels. The occurrence of smearing and bleeding is suppressed by performing recording according to original data and the created color ink data.

14 Claims, 27 Drawing Sheets

OBJECTIVE PIXEL

ORIGINAL BLACK IMAGE

BLACK DOT ADJACENT PIXEL IMAGE

BLACK DOT ADJACENT DEVELOPED PIXEL DATA

CYAN MASK (18%)

CYAN-APPLYING DATA

MAGENTA MASK (6%)

MAGENTA-APPLYING DATA

YELLOW MASK (5%)

YELLOW-APPLYING DATA

COLOR DOT ADJACENT
DEVELOPED PIXEL DATA

CYAN MASK 2 (30%)

CYAN-APPLYING
DATA

MAGENTA MASK 2 (5%)

MAGENTA-APPLYING
DATA

YELLOW MASK 2 (5%)

YELLOW-APPLYING
DATA

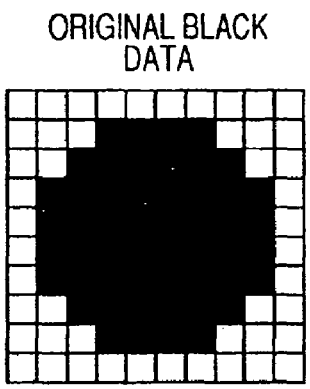
FIG. 14A — ORIGINAL BLACK DATA
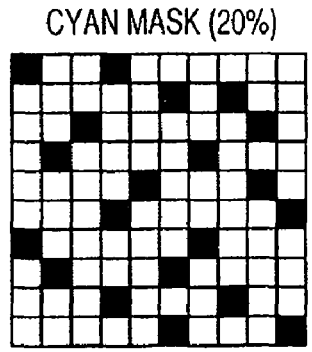
FIG. 14B — CYAN MASK (20%)
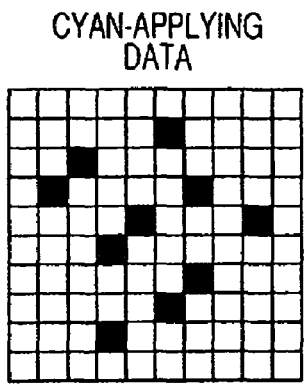
FIG. 14E — CYAN-APPLYING DATA
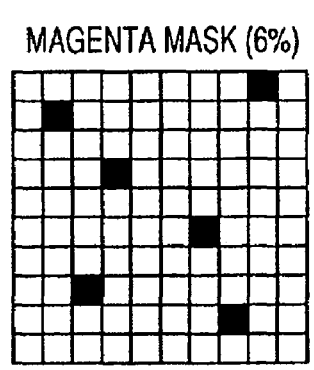
FIG. 14C — MAGENTA MASK (6%)
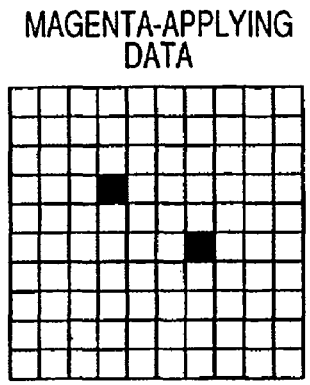
FIG. 14F — MAGENTA-APPLYING DATA
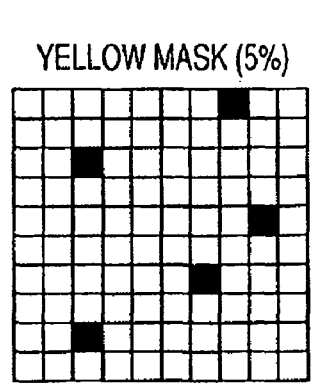
FIG. 14D — YELLOW MASK (5%)
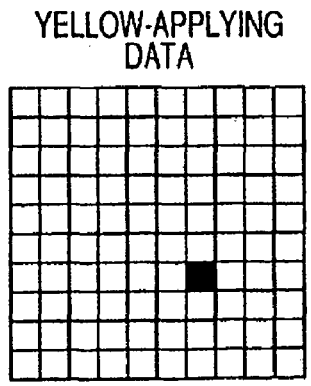
FIG. 14G — YELLOW-APPLYING DATA ORIGINAL Bk DATA

DATA ON PIXELS NOT ADJACENT TO COLOR DOTS

Bk DATA FOR PRINTING

DATA ON PIXELS ADJACENT TO COLOR DOTS

Bk MASK 2 (80%)

Bk PIXEL THINNED DATA

ORIGINAL Bk DATA

Bk INVERTED DATA

Bk INVERTED BOLD DATA

DATA ON PIXELS ADJACENT TO BLACK DOTS

ORIGINAL Bk DATA

ORIGINAL COLOR DATA

Bk INVERTED BOLD DATA

DATA ON PIXELS ADJACENT TO BLACK DOTS

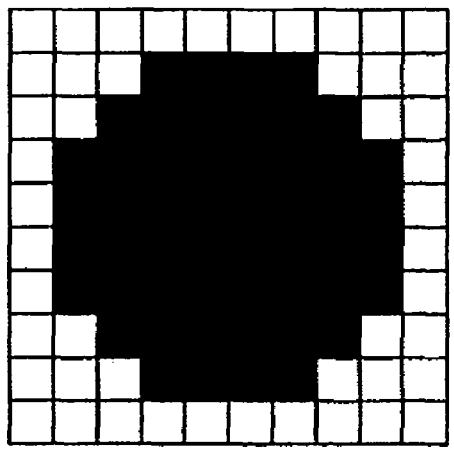
FIG. 23A  ORIGINAL Bk DATA
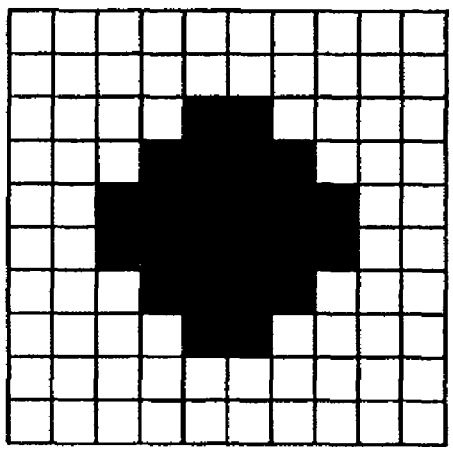
FIG. 23B  DATA ON PIXELS ADJACENT TO BLACK DOTS
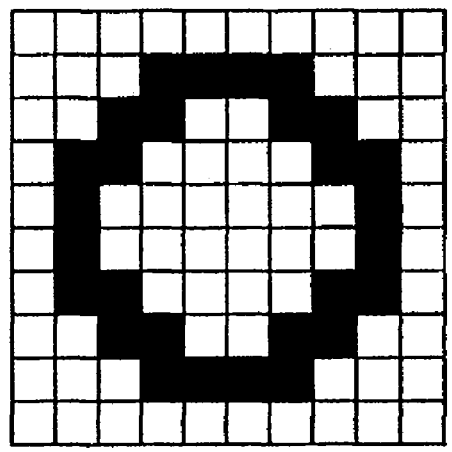
FIG. 23C  DATA ON PIXELS NOT ADJACENT TO BLACK DOTS

DATA ON PIXELS NOT ADJACENT TO BLACK DOTS

CYAN MASK 3 (9%)

CYAN-APPLYING DATA ON NONADJACENT PIXELS

CYAN-APPLYING DATA

MAGENTA MASK 3 (3%)

MAGENTA-APPLYING DATA ON NONADJACENT PIXELS

MAGENTA-APPLYING DATA

YELLOW MASK 3 (2.5%)

YELLOW-APPLYING DATA ON NONADJACENT PIXELS

YELLOW-APPLYING DATA

DATA ON PIXELS NOT ADJACENT TO BLACK DOTS

Bk MASK 2 (80%)

NONADJACENT PIXEL THINNED DATA

Bk RECORDING DATA

DATA ON PIXELS ADJACENT TO BLACK DOTS

Bk MASK 3 (60%)

ADJACENT PIXEL THINNED DATA

RECORDING APPARATUS AND DATA PROCESSING METHOD

TECHNICAL FIELD

The present invention relates to a recording apparatus for recording by using a plurality of recording heads capable of recording black ink and at least one color ink, and to a data processing method for processing data used in the recording by this recording apparatus.

BACKGROUND ART

In conventional practice, there are inkjet recording apparatuses that record images by ejecting ink onto various recording mediums. Inkjet systems are capable of high-density and high-speed recording operations. Therefore, inkjet recording apparatuses have been applied and commercialized as printers, portable printers, and other apparatuses that serve as the output media of various apparatuses.

Generally, an inkjet recording apparatus is equipped with a carriage for mounting a recording means (recording head) and an ink tank, a conveying means for conveying the recording medium, and a control means for controlling these components. The recording head, which ejects ink droplets from a plurality of ejection ports, is serially scanned in a direction (main scanning direction) orthogonal to the conveyance direction (sub-scanning direction) of the recording paper, and the recording medium is intermittently conveyed by an amount equal to the recording width (or an amount less than the recording width) when recording is not taking place.

Such inkjet systems have low running costs because they record images by ejecting ink in necessary amounts onto a recording paper according to recording signals. Inkjet systems are also quiet recording systems because they record images on a recording medium without contact. Many products used in color recording apparatuses have also been put into practice because of their advantages in being able to easily record in color by using a plurality of ink colors.

In color inkjet recording apparatuses that use a plurality of color inks, black ink is often used for printing characters and the like. Therefore, images printed with black ink require printing sharpness, clarity, and high printing concentration. In view of this, there are known techniques for reducing the permeability of black ink on the recording medium and preventing the coloring material in the black ink from permeating through the recording medium.

With color ink, when two inks of different colors are deposited on the recording medium adjacent to each other, the inks of different colors mix together at their borders, resulting in a phenomenon (bleeding) in which the quality of the color image is reduced. In order to prevent such a phenomenon, known techniques are used for increasing the permeability of color ink on the recording medium and preventing color inks from mixing together on the surface of the recording medium (for example, Japanese Patent Application Laid-Open No. S55-65269).

However, when the inkset described above is used, the following two problems occur.

The first problem is that the recording medium is stained because it takes a long time for black ink to become fixed. Specifically, although color ink has high permeability and therefore a short fixing time, black ink has low permeability and therefore a long drying and fixing time. The result is that when the next page is successively ejected following ejection of the previous page, a condition is established in which the black ink on the previous page has not completely dried. When such a condition occurs, sometimes either the printed surface of the previously printed page or the reverse surface of the subsequently printed page is stained (this staining of the printed surface and reverse surface is hereinafter referred to as "smearing"). This problem becomes more severe at higher printing speeds.

The second problem is image degradation occurring at the borders between images of black ink and images of color ink. Specifically, since black ink has low permeability, blurring (border bleeding) occurs at the border areas between black and color inks in images where black and color inks come in contact. This is a problem that significantly reduces the quality of images recorded in color.

Hitherto, the following measures have been used to resolve these two problems.

The first measure is a method of providing a heating and fixing unit or another such fixing means. For example, Japanese Patent Application Laid-Open No. H08-132724 discloses a recording apparatus with an inkjet system that includes a heating and fixing unit. Using the heating and fixing unit to quickly fix the ink on paper makes it possible to prevent smearing and border bleeding.

The second measure is a method for the queue control of paper ejection. In this method, either the printing of the second page is temporarily halted, or the ejection of the second page is temporarily halted after printing is completed. This is done in the time it takes for one page to be printed and sufficiently dried. The occurrence of smearing can thereby be prevented. For example, Japanese Patent Application Laid-Open No. H07-205416 discloses a configuration wherein the printed image is identified for the already-printed recording medium, and the standby time is set for the printing of the next recording medium.

The third measure is a method of depositing color ink with high permeability over the areas in which black ink is to be deposited. Black ink is deposited on the surface of paper that is already coated by color ink. Therefore, the black ink is easily fixed on the paper surface, and smearing can be prevented. Furthermore, border bleeding can be prevented by using a type of inkset in which black and color inks react and coalesce.

However, the measures described above have had the following problems.

The problem with the first measure is that the recording apparatus must be provided with a fixing means, which leads to increases in the size and cost of the apparatus. Also, since serial printers feed paper intermittently, there is a possibility that the fixing means will not be uniformly effective in various areas of the recording medium when the medium is passed through areas in which the fixing means can be active.

The problem with the second measure is that printing throughput is reduced because of the need to temporarily halt the ejection of printed recording mediums and to set aside a standby time during printing.

The problem with the third measure is that black images deteriorate in sharpness and black characters deteriorate in quality because color ink and black ink are printed overlapping each other. Also, it has been difficult to prevent both smearing and border bleeding when the amount of color ink needed to prevent smearing differs from the amount of color ink needed to prevent border bleeding.

DISCLOSURE OF THE INVENTION

The present invention was designed in view of the problems described above, and an object thereof is to provide an inkjet recording apparatus in which smearing and border bleeding can be prevented, and in which high-quality black characters can be recorded.

The recording apparatus according to the present invention for achieving these objects comprises the following configuration.

Specifically:

The present invention provides a recording apparatus that uses an ink-ejecting recording head and performs recording by ejecting black ink and at least one color ink onto a recording medium from the recording head, having extraction means for extracting, on the basis of recording data, at least one type of pixel selected from black adjacent pixels composed of pixels whose adjacent pixels are recorded with black ink, and color adjacent pixels that include pixels whose adjacent pixels are recorded with color ink, from among the pixels constituting a black image; data creating means for creating data that corresponds to color ink so that a pixel based on the color ink is recorded according to a given ratio on either the black adjacent pixels or the color adjacent pixels extracted by the extraction means; and recording control means for performing recording with the recording head on the basis of the recording data and the data created by the creating means.

The present invention also provides a data processing method for processing recording data in a recording apparatus that uses an ink-ejecting recording head and performs recording by ejecting black ink and at least one color ink onto a recording medium from the recording head, having an extraction step for extracting, on the basis of recording data, at least one type of pixel selected from black adjacent pixels composed of pixels whose adjacent pixels are recorded with black ink, and color adjacent pixels that include pixels whose adjacent pixels are recorded with color ink, from among the pixels constituting a black image; and a data creating step for creating data that corresponds to color ink so that a pixel based on the color ink is recorded according to a given ratio on either the black adjacent pixels or the color adjacent pixels extracted by the extraction means.

The present invention also provides a recording apparatus that uses an ink-ejecting recording head and performs recording by ejecting black ink and at least one color ink onto a recording medium from the recording head, having color conversion means for converting data that corresponds to a specific plurality of colors to data that corresponds to ink colors used in recording, extraction means for extracting black adjacent pixels composed of pixels whose adjacent pixels are recorded with black ink from among the pixels constituting a black image on the basis of data used in recording and obtained by the conversion of the color conversion means, data creating means for creating data that corresponds to color ink so that a pixel based on the color ink is recorded according to a given ratio on the black adjacent pixels extracted by the extraction means, and recording control means for performing recording with the recording head on the basis of the recording data and the data created by the creating means; wherein the color conversion means converts data of a specific plurality of colors indicating black to data that corresponds to black ink and data that corresponds to at least one color ink.

The present invention also provides a data processing method for processing recording data in a recording apparatus that uses an ink-ejecting recording head and performs recording by ejecting black ink and at least one color ink onto a recording medium from the recording head, having a color conversion step for converting data that corresponds to a specific plurality of colors to data that corresponds to ink colors used in recording; an extraction step for extracting, on the basis of data used in recording and obtained by the conversion in the color conversion step, black adjacent pixels composed of pixels whose adjacent pixels are recorded with black ink from among the pixels constituting a black image; and a data creating step for creating data that corresponds to color ink so that a pixel based on color ink is recorded according to a given ratio on the black adjacent pixels extracted by the extraction step; wherein the color conversion step converts data of a specific plurality of colors indicating black to data that corresponds to black ink and data that corresponds to at least one color ink.

The present invention also provides a recording apparatus that uses an ink-ejecting recording head and performs recording by ejecting black ink and at least one color ink onto a recording medium from the recording head, having black dot adjacent pixel detection means for detecting black pixels to which black dots are adjacent; color dot adjacent pixel detection means for detecting black pixels to which color dots are adjacent; first color dot applying data creating means for creating color dot data applied by taking the logical product of the pixels adjacent to black dots and a first color dot applying mask; second color dot applying data creating means for creating color dot data applied by taking the logical sum of the pixels adjacent to color dots and a second color dot applying mask; color dot applying data combining means for combining the color dot applying data created by the first color dot applying data creating means and the second color dot applying data creating means with original color data by finding their logical sum; and recording means for performing recording based on original black data and color data combined by the color dot applying data combining means.

The present invention also provides a recording, apparatus that uses an ink-ejecting recording head and performs recording by ejecting black ink and at least one color ink onto a recording medium from the recording head, having color reading/data switching means for switching between reading and not reading color data from memory according to a color dot count; black dot adjacent pixel detection means for detecting black pixels to which black dots are adjacent; color dot adjacent pixel detection means for detecting black pixels to which color dots are adjacent; first color dot applying data creating means for creating color dot data applied by taking the logical product of the pixels adjacent to black dots and a first color dot applying mask; second color dot applying data creating means for creating color dot data applied by taking the logical product of the pixels adjacent to color dots and a second color dot applying mask; color dot applying data combining means for combining the color dot applying data created by the first color dot applying data creating means and the second color dot applying data creating means with original color data by finding their logical sum; third color dot applying data creating means for creating color dot data applied by taking the logical product of black dots and a third color dot applying mask; printing color data selection means that uses either the data combined by the color dot applying data combining means or the third color dot applying data as printing color data; and recording means for performing recording based on original black data and the color data combined by the printing color data selection means.

According to the present invention, recording can be performed by appropriately applying dots of color ink for black images adjacent to color images or for black solid portions, and it is possible to resolve problems with smearing and bleeding on image borders.

BRIEF DESCRIPTION OF THE DRAWINGS

FIGS. 14A, 14B, 14C, 14D, 14E, 14F, and 14G are diagrams describing an example of creating data for a color ink applied for a black image in an embodiment of the present invention;

FIGS. 23A, 23B, and 23C are diagrams describing the creation of pixels (edge portions) not adjacent to black from black dots in an embodiment of the present invention;

BEST MODE FOR CARRYING OUT THE INVENTION

Embodiments relating to the recording apparatus of the present invention will now be described with reference to the diagrams. In the embodiments described hereinbelow, a printer is described as an example of a recording apparatus that uses an inkjet recording system.

(1) Description of Color Recording Apparatus

Figure 10:
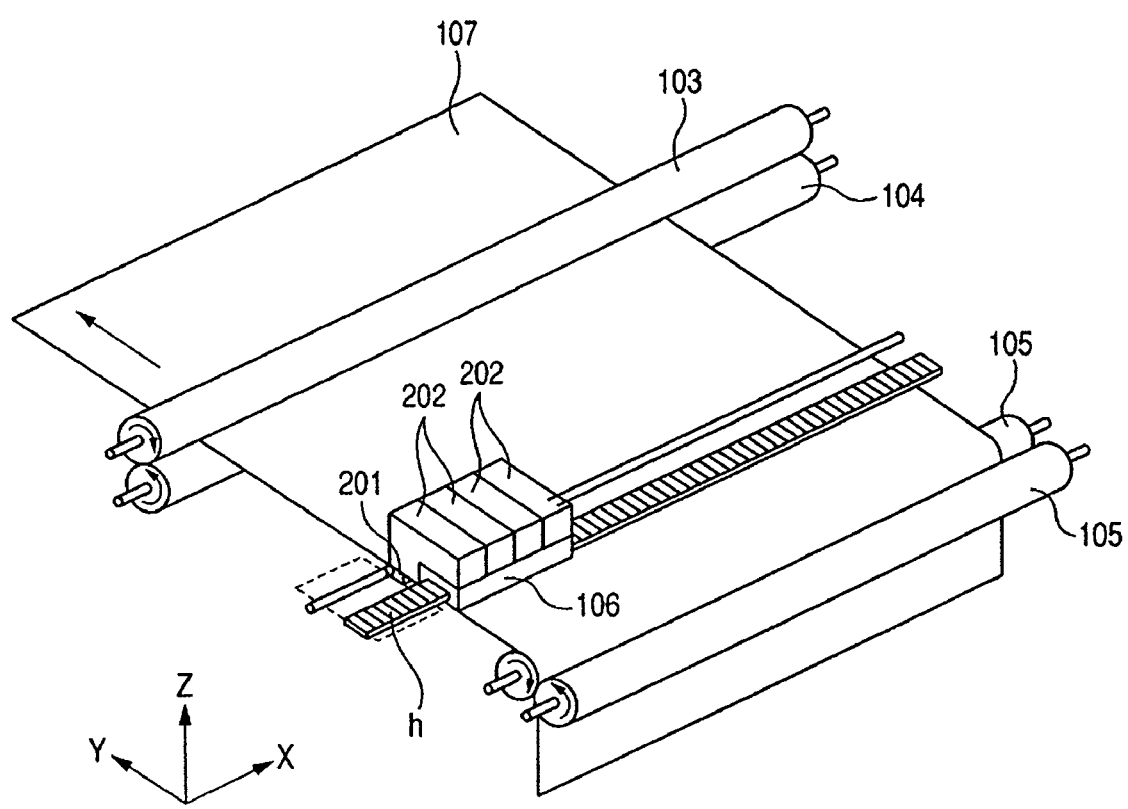
FIG. 10 is a schematic perspective view showing the configuration of a color inkjet recording apparatus in which the present invention can be applied.

FIG. 10 is a schematic perspective view showing the configuration of one embodiment of a color inkjet recording apparatus in which the present invention can be applied. In this diagram, the numerical symbols 202 indicate ink cartridges. Each of these cartridges has an ink tank filled with one of four color inks (black, cyan, magenta, yellow), and a recording head 201. The numerical symbol 103 indicates a paper-feeding roller, which rotates in the direction of the arrow in the diagram while pressing printing paper 107 together with an auxiliary roller 104 to supply the printing paper 107, and the rollers 103 and 104 both fulfill the role of pressing the printing paper 107. The numerical symbol 106 indicates a carriage that supports four ink cartridges and moves the mounted ink cartridges 202 and the recording head 201 as the printing operation is being performed. This carriage 106 is controlled so as to remain in standby mode in the home position shown by the dotted line in the diagram when the recording apparatus is not printing, or when the recovering operation of the recording head is being performed.

When a printing initiation command is received, the carriage 106, which is positioned at the position in the diagram before printing is initiated (home position), drives the recording elements provided to the recording head 201 while moving in the X direction to perform printing over an area corresponding to the recording width of the recording head on the paper surface. When printing is completed up to the end of the paper surface in the scanning direction of the carriage, the carriage returns to its original home position and begins recording again in the X direction. After the previous recording and scanning are complete, the paper-feeding roller 103 rotates in the direction of the arrow in the diagram before the next recording and scanning begin to feed paper by the necessary width in the Y direction. Thus, printing is completed on one side of the paper by repeating main scanning and paper feeding for printing. The recording operation of ejecting ink from the recording head is performed based on the control from recording control means (not shown).

Also, in order to increase the recording speed, another possible configuration is one wherein recording is not only performed during main scanning in one direction, but is also performed in the return path when recording during main scanning in the X direction is complete and the carriage is returned to the home position.

In the example described above, the ink tank and the recording head are supported on the carriage 106 in a manner in which they can be separated. Another possibility is an inkjet cartridge in which the ink tanks 202 for storing the recording ink and the recording head 201 for ejecting the ink onto the recording paper 107 are integrated. Yet another possibility is to use a multicolor integrated recording head capable of ejecting inks of a plurality of colors from a single recording head.

A capping means (not shown) that caps the front surface (ejection port surface) of the head, and a recovering unit (not shown) that performs a head-recovering operation to remove viscous ink or bubbles in the recording head in a capped state by the capping means, are provided to the position where the previously described recovering operation is performed. Also, a cleaning blade (not shown) or the like is provided to the side of the capping means and is supported to be capable of protruding towards the recording head 201, and is also capable of coming in contact with the front surface of the recording head. After the recovering operation, the cleaning blade thereby protrudes into the movement path of the recording head, and unnecessary ink droplets, stains, or the like on the front surface of the recording head are wiped away as the recording head moves.

(2) Description of Recording Head

Figure 11:
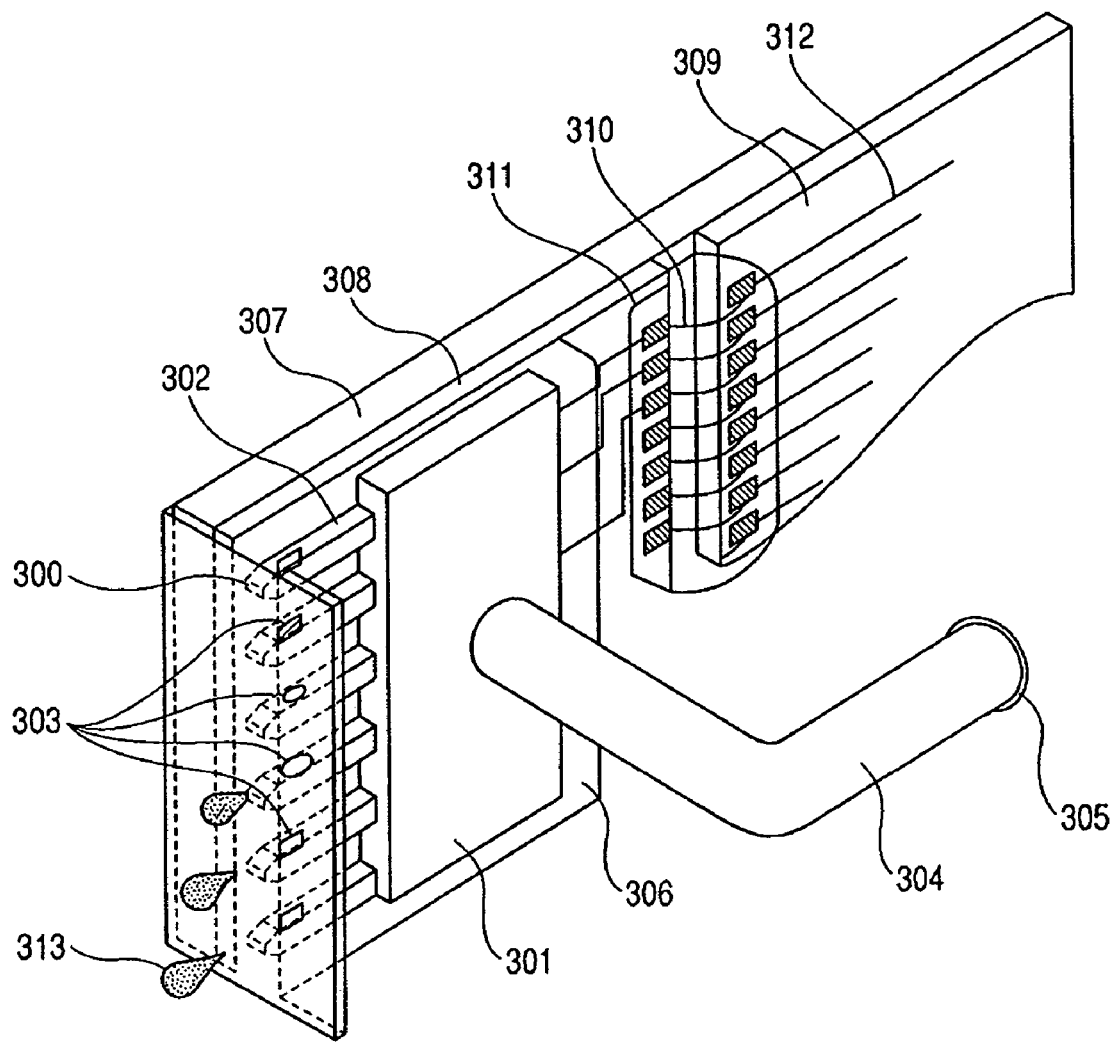
FIG. 11 is a perspective view showing the configuration of a principal part of a recording head in which the present invention can be applied.

Next, the recording head 201 will be described with reference to FIG. 11. FIG. 11 is a partial perspective view of a principal part of the recording head 201 shown in FIG. 10.

A plurality of ejection ports 300 are formed with a specific pitch on the recording head 201, as shown in FIG. 11. Also, recording elements 303 for creating ink-ejecting energy are disposed along the sides of liquid ducts 302 that link a common liquid chamber 301 and the ejection ports 300 together. A temperature sensor (not shown) and a sub-heater (not shown) are also formed on the recording head 201. A silicon plate 308 is bonded to an aluminum base plate 307 for heating. A circuit connector 311 and a print plate 309 on the silicon plate 308 are connected by a wire 310, and signals from the recording apparatus main body are received via a signal circuit 312. The liquid ducts 302 and the common liquid chamber 301 are formed by a plastic cover 306 made by injection molding. The common liquid chamber 301 is communicated with the ink tank shown in FIG. 10 via a joint pipe 304 and an ink filter 305. The ink supplied from the ink tank flows into the liquid ducts 302 from the common liquid chamber 301, and forms a meniscus in the ejection ports 300. When electricity is supplied to the recording elements 303, the ink is rapidly heated by the heat generated by the recording elements 303, creating bubbles in the liquid ducts 302, and ink droplets 313 are ejected from the ejection ports 300 due to the swelling of these bubbles.

(3) Description of Control Configuration

Figure 12:
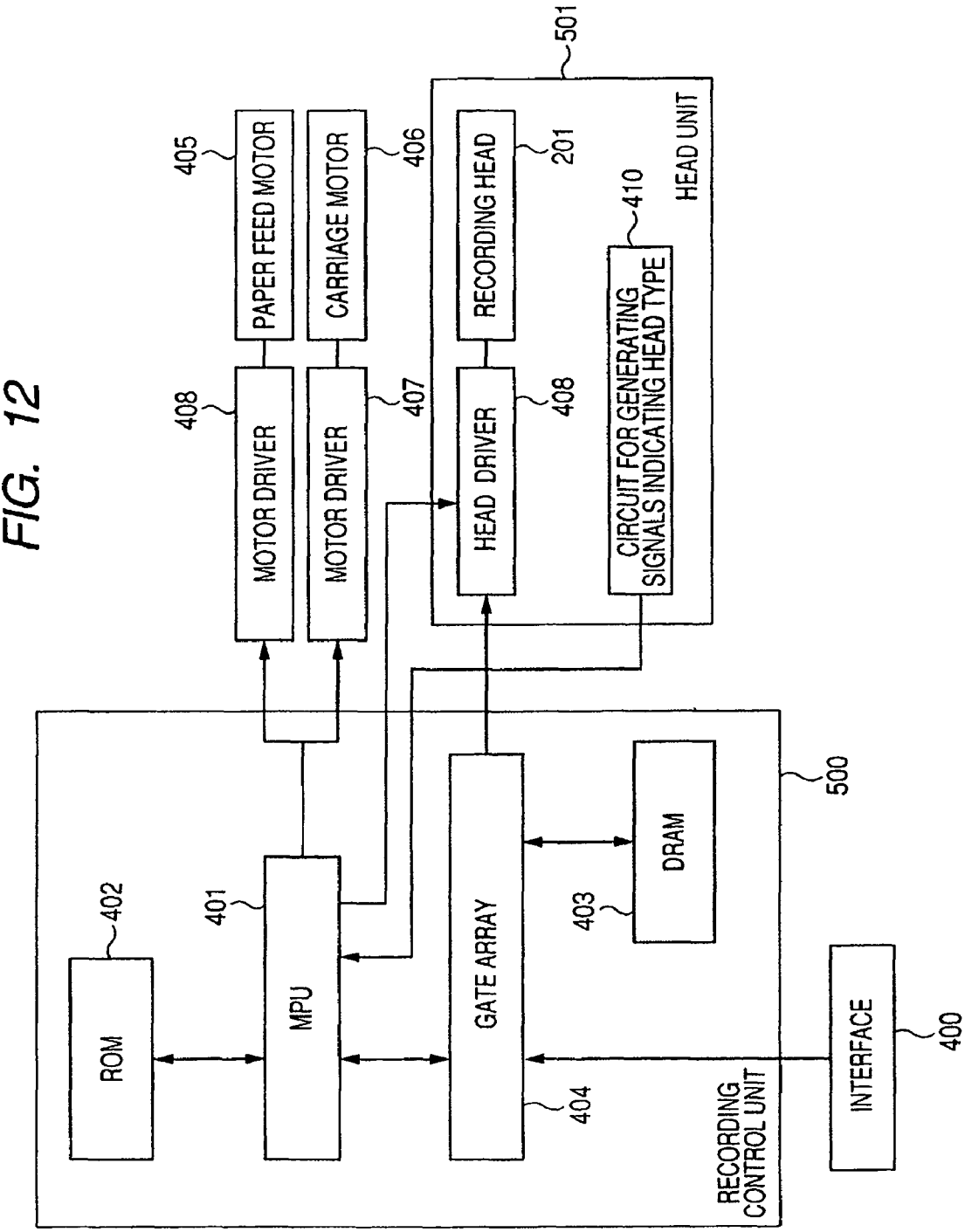
FIG. 12 is a control block diagram of an inkjet recording apparatus in which the present invention can be applied.

Next, the control configuration for controlling the recording operations of the parts of the apparatus structure will be described with reference to the block diagram shown in FIG. 12. In the diagram that shows the control circuits, the numerical symbol 400 indicates an interface for inputting recording signals, 401 indicates an MPU 402 indicates program ROM for storing a control program executed by the MPU 401, and 403 indicates dynamic RAM (DRAM) for preserving various data (recording signals, or recording data or the like supplied to the head). The number of printed dots and the number of times the ink recording head has been replaced, or the like, can also be stored. The numerical symbol 404 indicates a gate array for controlling the supply of recording data to the recording head, and also for controlling the transfer of data between the interface 400, the MPU 401, and the DRAM 403. The numerical symbol 405 indicates a carrier motor (CR motor) for conveying the recording head, and 406 indicates a conveying motor (LF motor) for conveying recording paper. The numerical symbols 407 and 408 indicate motor drivers for driving the conveying motor 405 and the carrier motor 406, respectively. The numerical symbol 409 indicates a head driver for driving the recording head 410.

Embodiment 1

The first embodiment of the present invention will now be described with reference to the diagrams.

The present embodiment involves a configuration in which printing data is stored in memory, the data is read from memory, and is written back into memory after being processed, wherein the Bk, C, M, Y data is read from memory when the color dot count of the print data is not 0. The logical product of the black dots in a 3×3 matrix centered around the black objective pixels is then taken, and if the logical product gives a positive outcome, the pixels adjacent to black dots of the objective pixels that have been turned on are used as data on pixels adjacent to black dots, and the logical product with the first color dot applying mask is found, thereby creating first color dot applying data. Then, the logical sum of the color dots in a 3×3 matrix centered around black objective pixels is found, and if black dots are present in the objective pixels and the logical sum gives a positive outcome, then the pixels adjacent to color dots of the objective pixels that have been turned on are used as data on pixels adjacent to color dots, and the logical product with the second color dot applying mask is found, thereby creating second color dot applying data. The first color dot applying data and the second color dot applying data are combined with the original color data and are then written and recorded back into memory as recording data, whereby border bleeding and smearing are prevented, and high-quality black characters can be recorded.

When the color dot count of the print data is 0, only the Bk data is read from memory. Third color dot applying data is created by finding the logical product of the original black data and the third color dot applying mask, and then written into memory as recording data, whereby while the effects of border bleeding prevention, such as are seen in the previous process, cannot be obtained, smearing is prevented when printing at high speeds, and high-quality black characters can be recorded.

Next, the entire data process in the present embodiment will be described.

Figure 1:
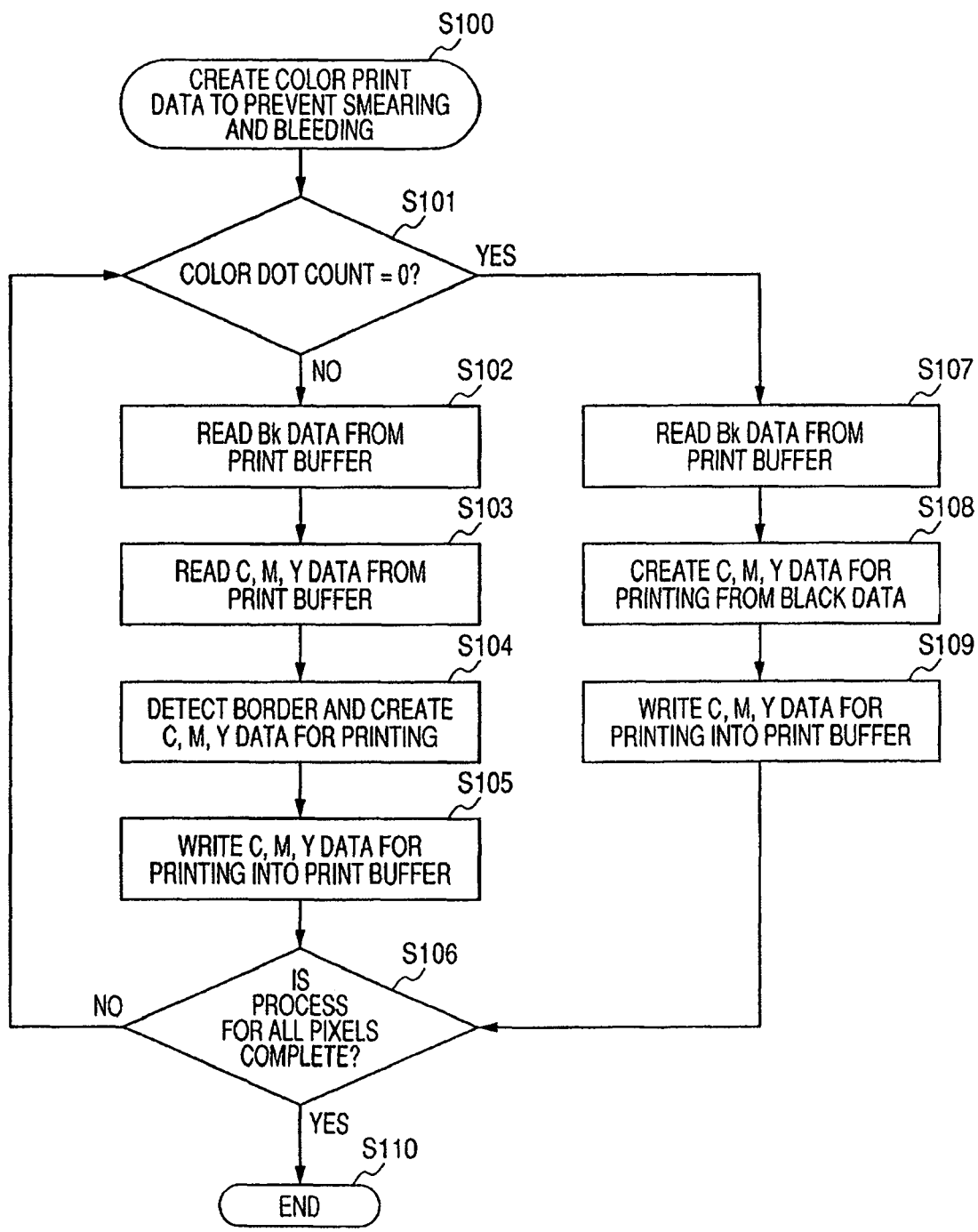
FIG. 1 is a flowchart showing the process of creating color print data in Embodiment 1 of the present invention.

FIG. 1 is a flowchart describing the process of creating color print data intended to prevent smearing and bleeding at the borders of an image.

In a print mode for recording high-quality black character images, it is determined whether to read Bk, C, M, Y data from memory when the color dot count of the print data is not 0, or to read Bk data alone from memory when the color dot count of the print data is 0 (S101). Bk data is read from memory to prevent border bleeding and smearing so that higher-quality black characters are obtained (S102), and then the C, M, Y data is read from memory (S103). The borders are detected from the Bk, C, M, Y data thus read, and color print data for preventing border bleeding and smearing is created (S104). The created C, M, Y printing data is written into memory (S105). If all the data is complete, the process is ended (S106), and if not, the process is repeated. If the color dot count of the print data is 0, the Bk data is read from memory (S107). Color print data for smearing prevention is created from the read black data (S108). The created C, M, Y printing data is written into memory (S105). If all the data is complete, the process is ended (S106), and if not, the process is repeated. The color dot count of the print data is preferably set to an appropriate value according to the configuration of the recording apparatus.

Figure 2:
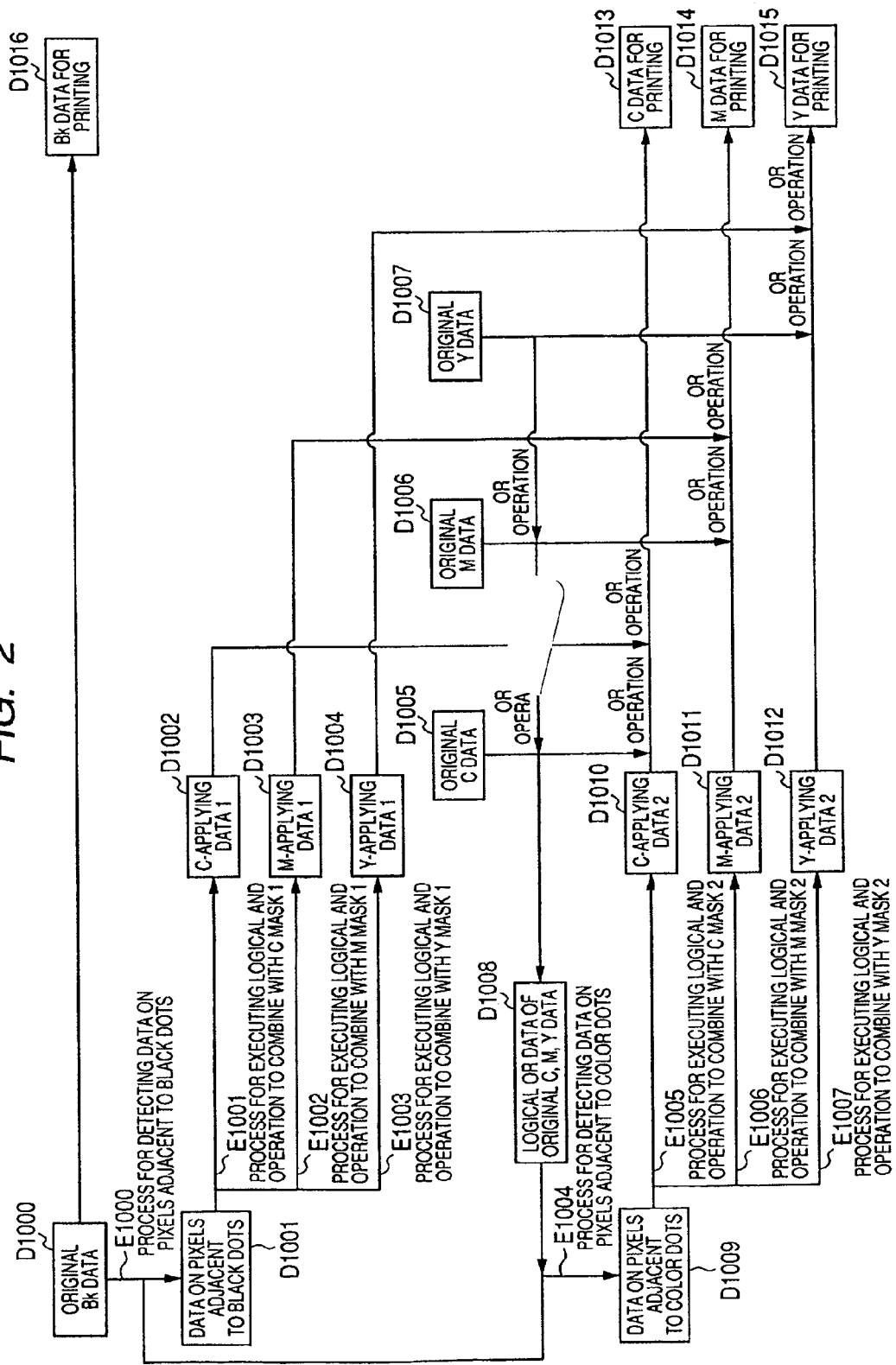
FIG. 2 is a flowchart describing the process for detecting objective pixels on which color dots will be applied in Embodiment 1 of the present invention.

FIG. 2 is a block diagram describing the flow of detecting pixels adjacent to black dots, detecting pixels adjacent to color dots, creating color dot applying data, and creating printing data.

The original Bk data (D1000) is used to perform a detecting operation (E1000) for the pixels adjacent to black dots that will apply color dots to be printed to prevent smearing, thereby creating data on pixels adjacent to black dots (D1001). The logical products of the data on pixels adjacent to black dots (D1001) with the C mask 1 (E1001), the M mask 1 (E1002), and the Y mask 1 (E1003) are then found to create C applying data 1 (D1002), M applying data 1 (D1003), and Y applying data 1 (D1004).

Next, the original Bk data (D1000) is used with the original C, M, Y OR data (D1008), which is the logical sum of the original C data (D1005), the original M data (D1006), and the original Y data (D1007), to perform a detecting operation (E1004) for the pixels adjacent to color dots that will allow color dots to be printed to prevent border bleeding, thereby creating data (D1009) on pixels adjacent to color dots. The logical products of the data on pixels adjacent to color dots (D1009) with the C mask 2 (E1005), the M mask 2 (E1006), and the Y mask 2 (E1007) are then taken to create C applying data 2 (D1010), M applying data 2 (D1011), and Y applying data 2 (D1012). The logical sum of the original C data (D1005), the C applying data 1 (D1002), and the C applying data 2 (D1010) is then taken to create printing data C (D1013). Printing data M (D1014) and printing data Y (D1015) are created by the same operation. The original Bk data (D1000) is not processed and is directly used for printing data Bk (D1016).

Figure 3:
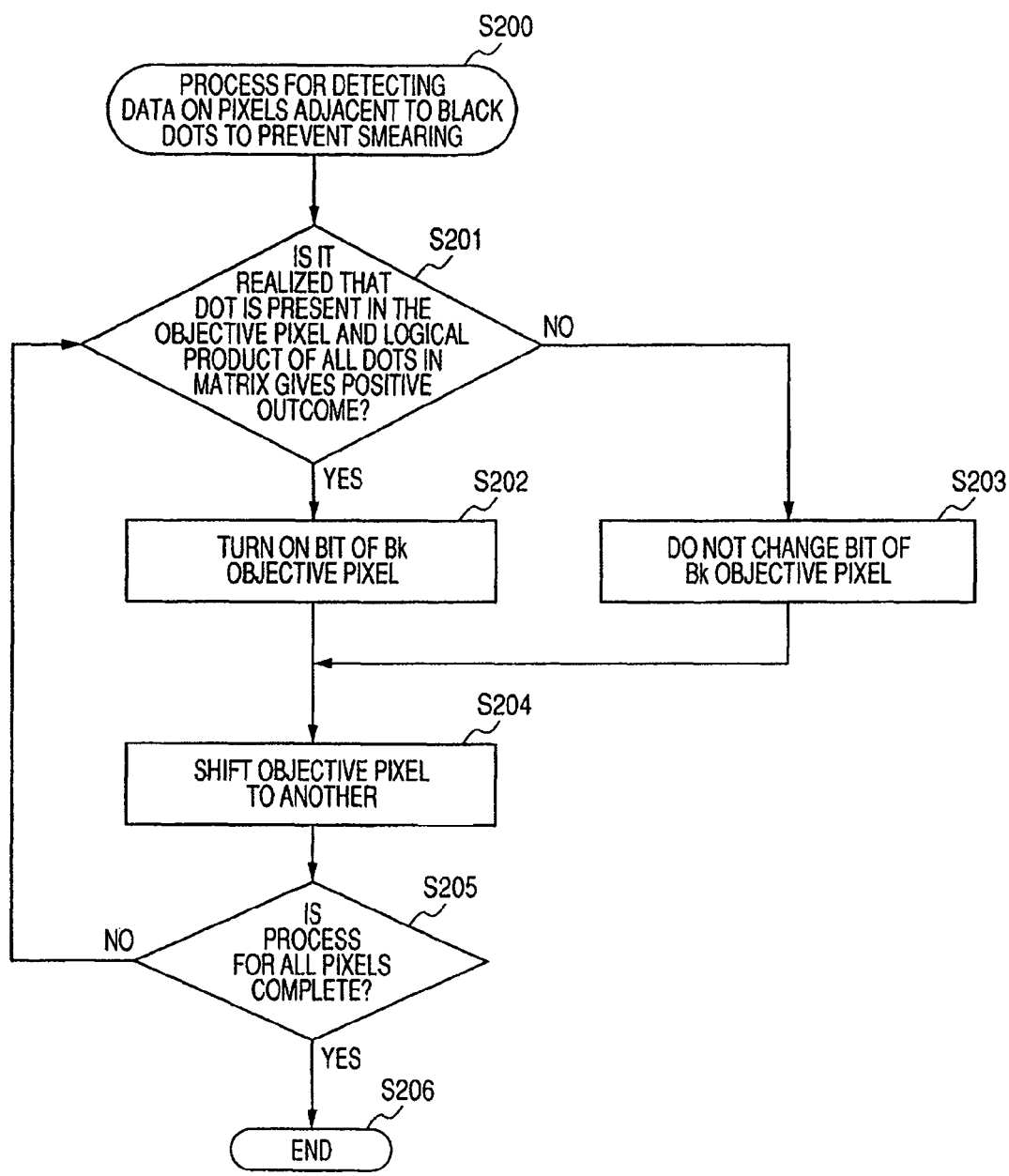
FIG. 3 is a flowchart describing the process for detecting objective pixels on which color dots will be applied in order to prevent smearing in Embodiment 1 of the present invention.

1. Detecting Operation for Color Dot Applying Objective Pixels 1.1 Detecting Pixels Adjacent to Black Dots FIG. 3 is a flowchart showing the process of detecting pixels adjacent to black dots (also referred to as black adjacent pixels), which are pixels with black dots in proximity. Although the description in this embodiment refers to the process of determination for each pixel as "detection", the process in question may also be referred to as "extraction" because it is also a process of extracting pixels that fulfill specific conditions from among many pixels.

In the present invention, of the pixels constituting a black image, those composed of pixels wherein the adjacent pixels are recorded with black ink are referred to as pixels adjacent to black dots (also as black adjacent pixels). In other words, if the periphery of the objective pixels is configured from black pixels, then the objective pixels are black adjacent pixels.

It is determined whether a black dot is present in the objective pixel and whether a black dot is present in a 3×3 matrix (S201). If the logical product of the black dots in the 3×3 matrix gives a positive outcome, then the bit of the objective pixel is turned on (S202). If not, then the bit of the objective pixels is not changed (S203). Next, the objective pixel is shifted (S204). If all of the data is complete, then the process is ended (S205), and if not, the process is repeated.

Figure 4A:
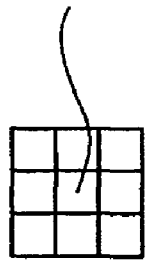
FIGS. 4A, 4B, and 4C are diagrams describing the process of detecting objective pixels on which color dots will be applied in an embodiment of the present invention.
Figure 4B:
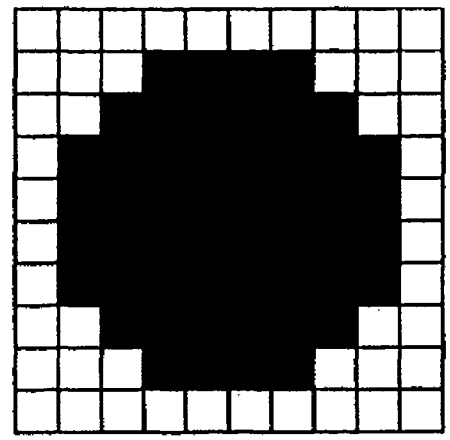
Figure 4C:
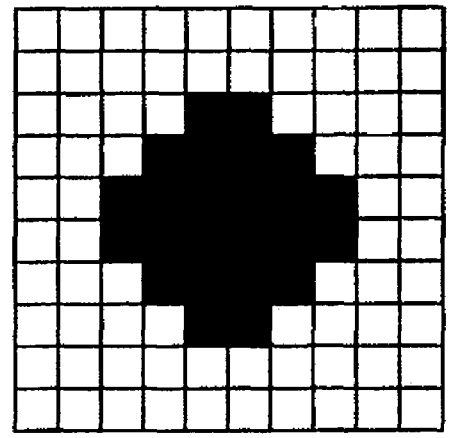

FIGS. 4A through 4C depict an example of detecting pixels adjacent to black dots. In the 10×10 pixel locations these diagrams, the pixels indicating recording are shown in black, and non-recorded pixels are indicated with a white mask. In the descriptions hereinbelow, recorded pixels and non-recorded pixels are indicated in the same manner.

FIG. 4A depicts a 3×3 matrix centered on an objective pixel. FIG. 4B depicts a black original image. The original black data is processed while shifting the 3×3 matrix by one pixel sequentially. If the bits of the objective pixels are turned on when the logical product of the matrix gives a positive outcome, pixels adjacent to black dots can be detected, such as is shown in FIG. 4C.

As can be seen from FIG. 4C, only a black area with relatively high duty is detected by this process. Since the edge areas with relatively low duty are not detected, color dots are not applied, and the sharpness of the black image can be preserved.

1.2 Detecting Pixels adjacent to Color Dots to Prevent Bleeding

Figure 5:
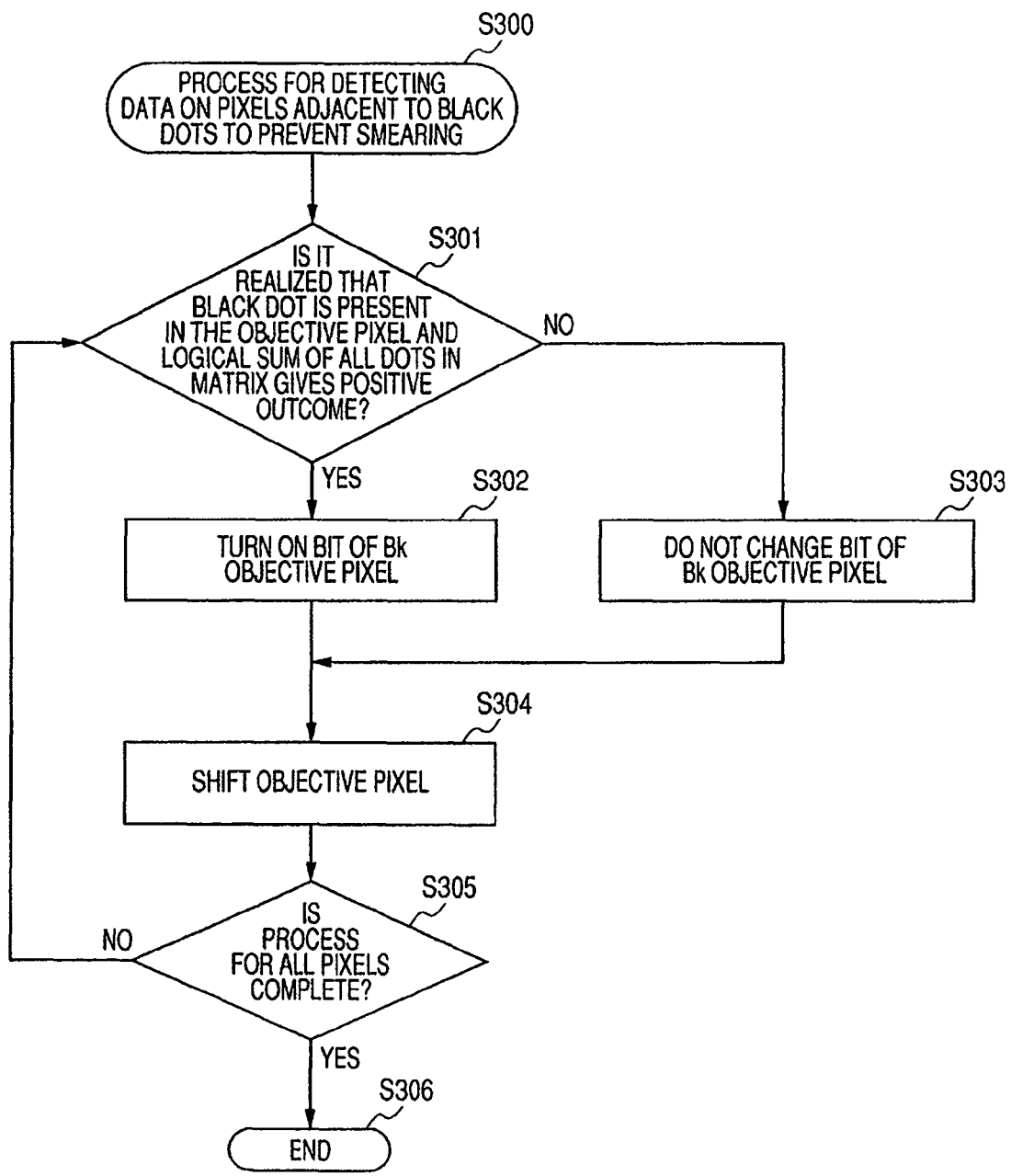
FIG. 5 is a flowchart describing the process of detecting objective pixels on which color dots will be applied in order to prevent bleeding between black and color inks in an embodiment of the present invention.

FIG. 5 is a flowchart showing the process of detecting specific pixels. The process is performed in order to preventing the occurrence of bleeding in the borders between black and color inks. The specific pixels referred to herein are black pixels having color dots located in their proximity, and are referred to as pixels adjacent to color dots (also as color adjacent pixels) in this description. The color adjacent pixels are pixels corresponding to the edge portions of the black image, and are also referred to simply as edge portions.

It is determined whether a black dot is present in the objective pixels and whether a color dot is present in a 3×3 matrix (S301). If the logical sum of the color dots in the 3×3 matrix gives a positive outcome, then the bit of the objective pixel is turned on (S302). If not, then the bit of the objective pixel is not changed (S303). Next, the objective pixel is shifted (S304). If all of the data is complete, then the process is ended (S305), and if not, the process is repeated.

FIGS. 6A through 6D show an example of detecting pixels adjacent to color dots in order to prevent bleeding. The pixels adjacent to color dots (also referred to as pixels adjacent to color dots) indicate pixels in a black image that are located adjacent to color dots.

Figure 6A:
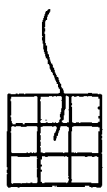
FIGS. 6A, 6B, 6C, and 6D are diagrams describing the process of detecting objective pixels on which color dots will be applied in an embodiment of the present invention.
Figure 6B:
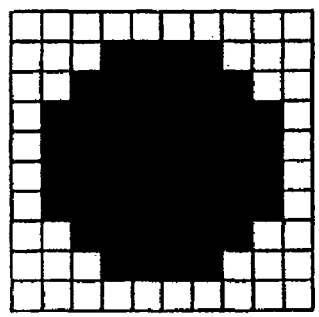
Figure 6C:
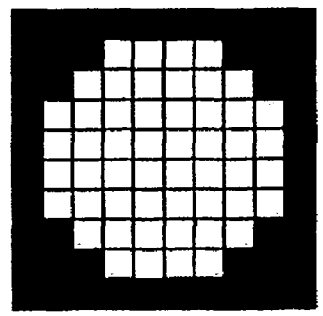
Figure 6D:
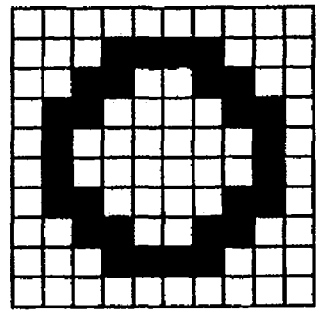

FIG. 6A depicts a 3×3 matrix centered on an objective pixel. FIG. 6B depicts a black original image, and FIG. 6C depicts a color original image. The original black data and the original color data are processed while the 3×3 matrix is shifted in one-pixel increments. If the bit of the objective pixel is turned on when the total number of color dots in the matrix is one or more, then the color dot applying objective pixels can be detected, as is shown in FIG. 6D. The pixels shown in FIG. 6D are the edge portions of the black image pattern shown in FIG. 6B, and are configured from black pixels located at the border with the color image. As can be seen from FIG. 6D, only the border areas between black and color inks are detected by this process applying color dots in the black pixels in the detected border areas makes it possible to prevent bleeding, which readily occurs at the borders between color images and black images.

In step S201 of the flowchart shown in FIG. 3, a determination is made as to whether the objective pixel is a black dot, and whether a black dots is present in a 3×3 matrix. This process is not limited to the process shown in the flowchart. For example, the process may involve counting the number of black dots present in a 3×3 matrix centered on the black objective pixel, and determining whether or not nine black dots are present. If nine black dots are present, then the process progresses to step S202 in FIG. 3, and if less than nine dots are present, then the process advances to step S203. The same results from the process in FIG. 3 can be obtained with this process.

The process in step S301 shown in FIG. 5 can also be replaced by a process in which it is determined whether a black dot is present in the objective pixel and whether or not the total number of color dots present in a 3×3 matrix is one or more. In this process, the bit in the objective pixel is turned on if the total number of color dots is one or more (S302), and if not, the bit in the objective pixel is turned off (S303).

2. Creating Color Dot Applying Data

2.1 Creating Color Dot Applying Data for Preventing Smearing

FIGS. 7A through 7G are diagrams describing an example of creating color dot applying data for preventing smearing.

Figure 7A:
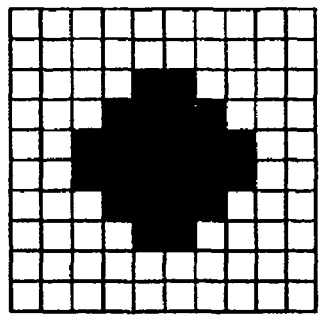
FIGS. 7A, 7B, 7C, 7D, 7E, 7F, and 7G are diagrams describing the process of creating data on color dots for preventing smearing in an embodiment of the present invention.

FIG. 7A depicts the data on pixels adjacent to black dots described in FIG. 4C.

Figure 7B:
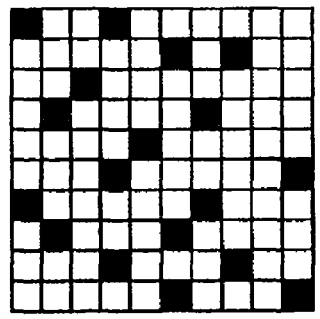
Figure 7E:
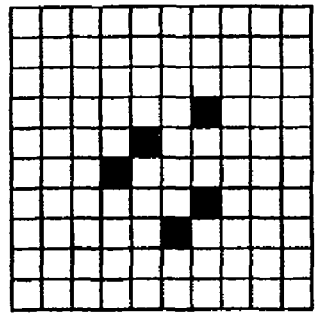
Figure 7C:
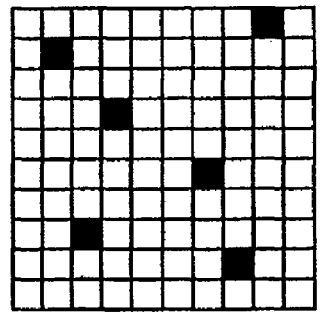
Figure 7F:
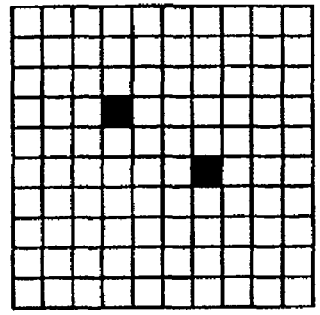
Figure 7D:
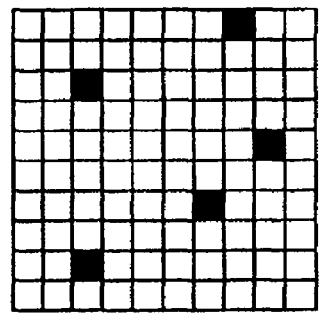
Figure 7G:
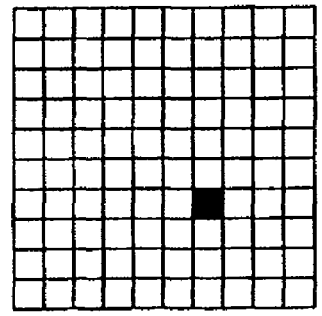

FIGS. 7B, 7C, and 7D depict masks 1 corresponding to cyan, magenta, and yellow for creating a specific amount of applying data. The ratio of the amount of applying data for these colors is 18% cyan, 6% magenta, and 5% yellow. The data for these colors, as shown in FIGS. 7E, 7F, and 7G, is created by taking the logical product of the data in FIG. 7A with the masks 1 of each color. The data thus created is data for applying a color ink in a black image. The amount of applying data and mask size for each color are preferably set to appropriate values according to the characteristics of the ink and the configuration of the recording apparatus. The method of disposing dots in the masks may afford certain regularity, or may be somewhat random.

2.2 Creating Color Dot applying Data for Preventing Bleeding

FIGS. 8A through 8G are diagrams describing an example of creating color dot applying data intended to prevent bleeding.

Figure 8A:
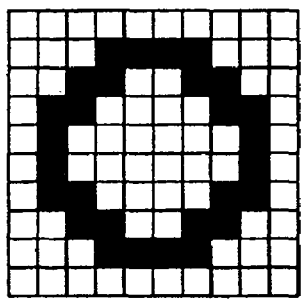
FIGS. 8A, 8B, 8C, 8D, 8E, 8F, and 8G are diagrams describing the process of creating data on color dots for preventing bleeding in an embodiment of the present invention.

FIG. 8A depicts the data on pixels adjacent to color dots described in FIG. 6D.

Figure 8B:
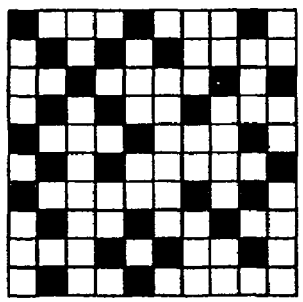
Figure 8E:
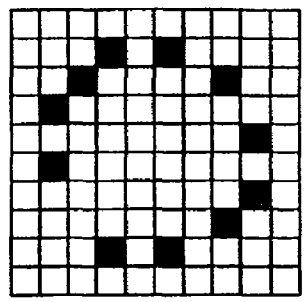
Figure 8C:
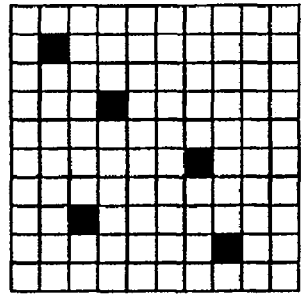
Figure 8F:
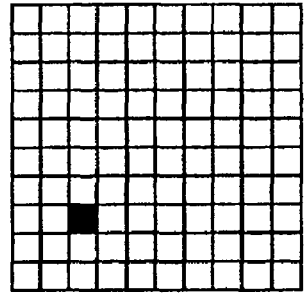
Figure 8D:
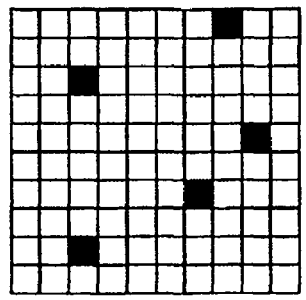

FIGS. 8B, 8C, and 8D depict masks 2 corresponding to cyan, magenta, and yellow for creating specific amounts of applying data. The ratio of the amount of applying data for these colors is 30% cyan, 5% magenta, and 5% yellow. Therefore, the masks corresponding to these colors are configured so as to apply the colors at a set ratio.

Figure 8G:
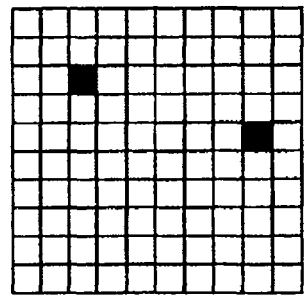

Data for these colors, as shown in FIGS. 8E, 8F, and 8G, is created by taking the logical products of the data in FIG. 8A and the masks 2 of each color. The data thus created is data that applies color ink to prevent or reduce the occurrence of bleeding. The reason that there is a relatively large applying amount of cyan is because only cyan ink reacts with black ink, and the recording apparatus is assumed to have an aggregation-type ink system. The amount of applying data and mask size for each color are preferably set to appropriate values according to the characteristics of the ink and the configuration of the recording apparatus. The method of disposing dots in the masks may afford certain regularity or may be somewhat random.

3. Creating Color Ink Printing Data

Figure 9:
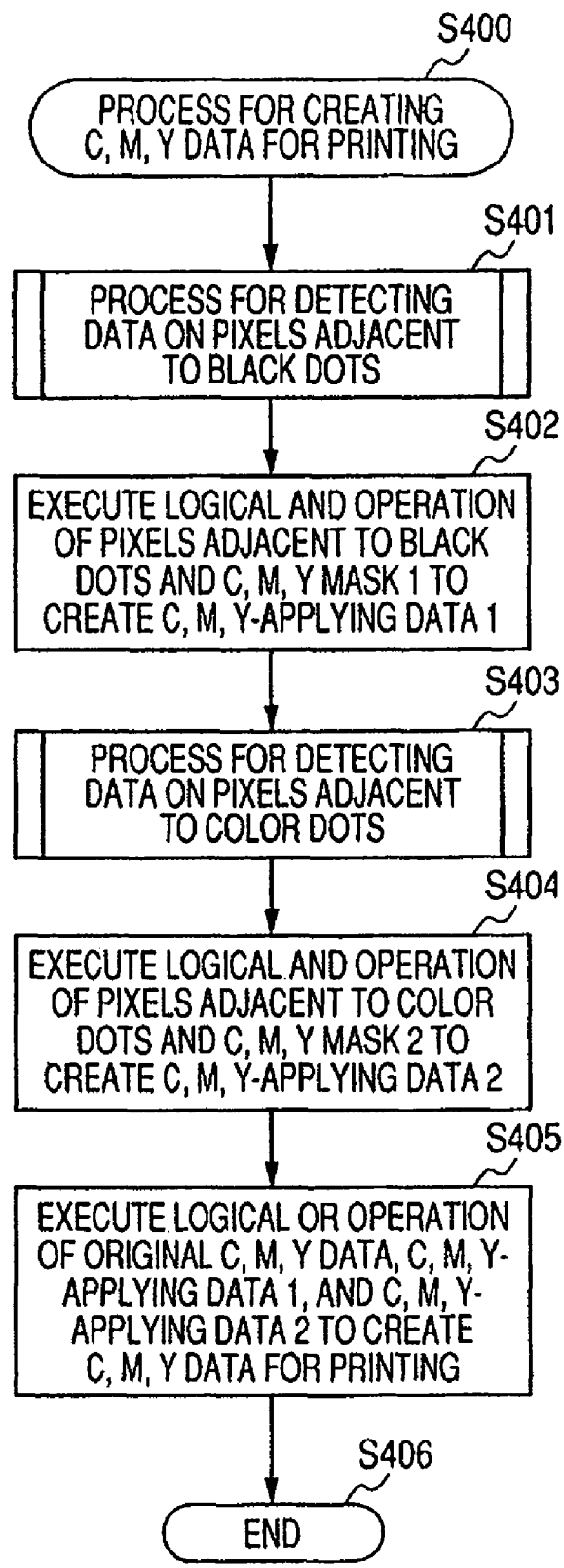
FIG. 9 is a flowchart describing the process of creating color ink printing data over a black image in an embodiment of the present invention.

FIG. 9 is a flowchart of the process of creating color ink printing data.

First, data on pixels adjacent to black dots is detected (S401). Next, applying data 1 for cyan, magenta, and yellow is created by taking the logical products of the data on pixels adjacent to black dots with the masks 1 of cyan, magenta, and yellow (S402). Then, data on pixels adjacent to color dots is detected (S403), and the logical products of this data and the masks 2 of cyan, magenta, and yellow are taken to create applying data 2 for cyan, magenta, and yellow (S404). Finally, the logical sums of the original cyan, magenta, and yellow data, the applying data 1 for each color, and the applying data 2 for each color are taken to create cyan, magenta, and yellow printing data (S405).

As described above, according to the present embodiment, applying color dots in black data of relatively high duty, with the exception of the edge areas of characters, makes it possible to prevent smearing in high-duty areas and to record high-quality black characters with sharp edges. Furthermore, applying color dots with an amount that is different from the amount of applied color dots at which smearing occurs in the border areas between black and color inks makes it possible to record high-quality color images with suppressed border bleeding between black and color inks.

In the process of extracting black adjacent pixels and color adjacent pixels in the embodiment described above, the dots recorded in a 3×3 matrix were determined. However, the size of the matrix is not limited to the size described. For example, an even larger matrix size (for example, a matrix size of 5×5, 7×7, etc.) may be used. The number of pixels equivalent to one side of the matrix is preferably an odd-numbered positive integer because the determination is made with the objective pixel in the center. Particularly, in cases in which black ink and color ink greatly affect each other on the recording medium, problems of image quality degradation due to ejection of ink onto the recording medium can be avoided by increasing the size of the matrix.

Also, in Embodiment 1, an example is given in which black solid portions are processed in order to prevent smearing, and black edge portions are also processed in order to prevent border bleeding, but the present invention is not limited to this configuration. For example, processing at least one type of portion selected from among black solid portions and black edge portions will still make it possible to resolve at least one of the problems with smearing and bleeding, and also to improve image quality compared to a configuration that does not implement either process. Also, it is also conceivable that either smearing or bleeding alone may case severe image quality loss depending on the composition of black ink and color ink. In such cases, it is possible to achieve sufficient image quality improvement by implementing only one of the processes correlated with the cause of image quality degradation from among the process involving the black solid portions and edge portions described above.

Embodiment 2

Next, the second embodiment of the present invention will be described with reference to FIGS. 13 through 15.

In addition to the processes in Embodiment 1, the present embodiment involves applying color ink in an image based on original black data by a process such as the one shown in FIGS. 14A through 14G when there are no color dots in the print data, that is, when the value obtained by counting the color dots is 0.

Figure 13:
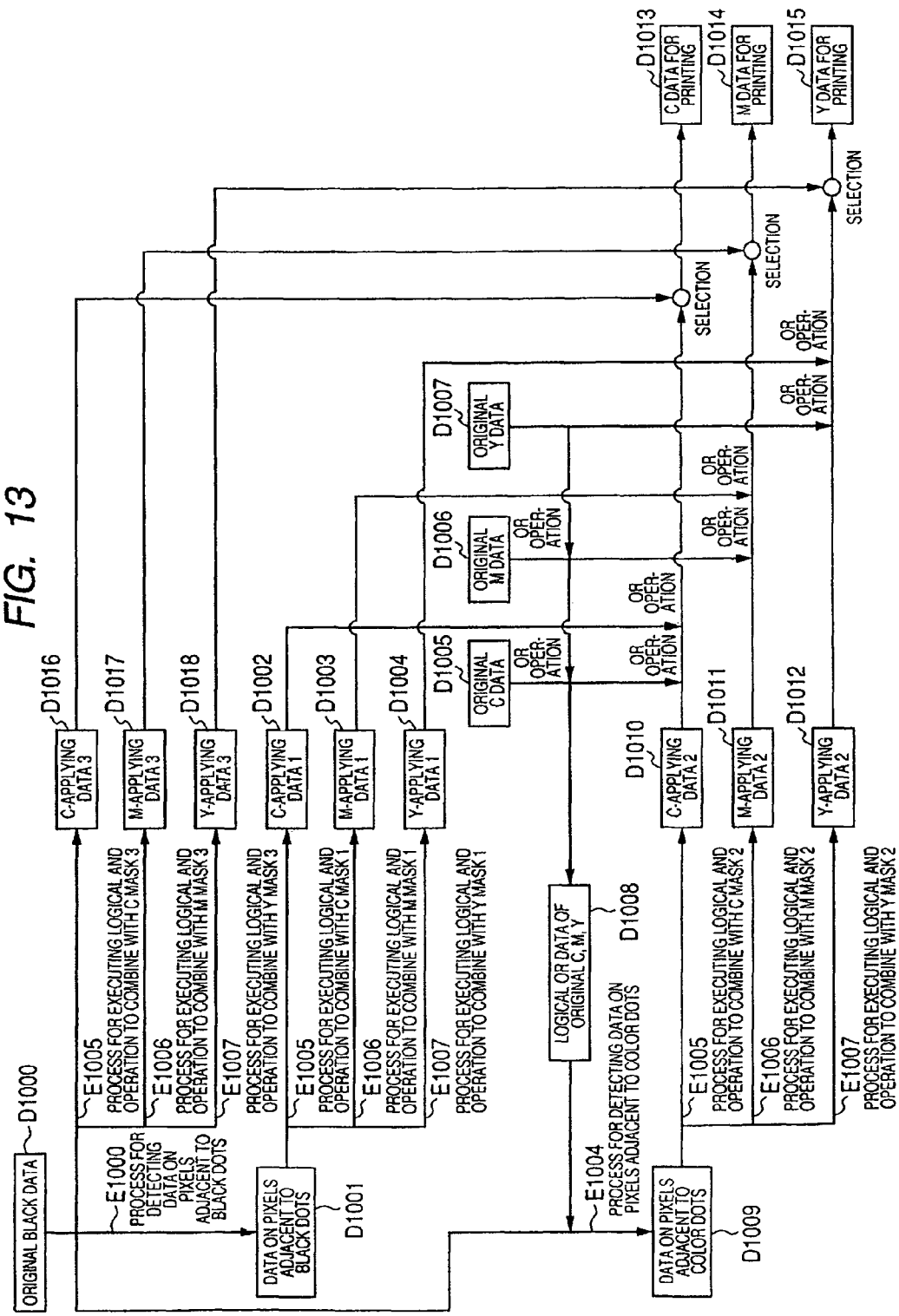
FIG. 13 is a block diagram describing the flow of processing and of data creation in an embodiment of the present invention.

FIG. 13 is a block diagram describing the flow of detecting pixels adjacent to black dots, detecting pixels adjacent to color dots, creating color dot applying data, and creating-printing data. In FIG. 13, configurations common to the block diagram shown in FIG. 2 are denoted by the same numerical symbols.

When the print data includes data for recording color dots, the process is performed according to the blocks that are common to both FIG. 13 and FIG. 2. Therefore, a description of the process when color dots are present is omitted.

In a printing mode of recording high-quality black character images, sometimes there is no data indicating color dots present in the print data. When no color dots are present in the print data, the color data (D1016, D1017, D1018) shown in FIG. 13 is created and recorded together with the original black data.

The process of creating this color data (D1016, D1017, D1018) will now be described with reference to FIGS. 14A through 14G.

FIGS. 14A through 14G are diagrams describing the process of creating color dot data intended to prevent bleeding and smearing in black images when the color dot count of the print data is 0.

FIG. 14A depicts original black data. Since the dot count of the color data is 0, there is no need to determine the borders with the color data. Therefore, the data for applying color ink is created using the original black data and the masks corresponding to each color.

FIGS. 14B through 14D depict masks 3 of cyan, magenta, and yellow for creating specific amounts of applying data. The ratio of the amount of applying data for these colors is 20% cyan, 6% magenta, and 5% yellow. The applying data for these colors in FIGS. 14E through 14G is created by taking the logical product of the data on pixels adjacent to black dots with the masks 3 of each color. The amount of applying data and mask size for each color are preferably set to appropriate values according to the characteristics of the ink and the configuration of the recording apparatus. The method of disposing dots in the masks may afford certain regularity, or may be preudorandom.

Figure 15:
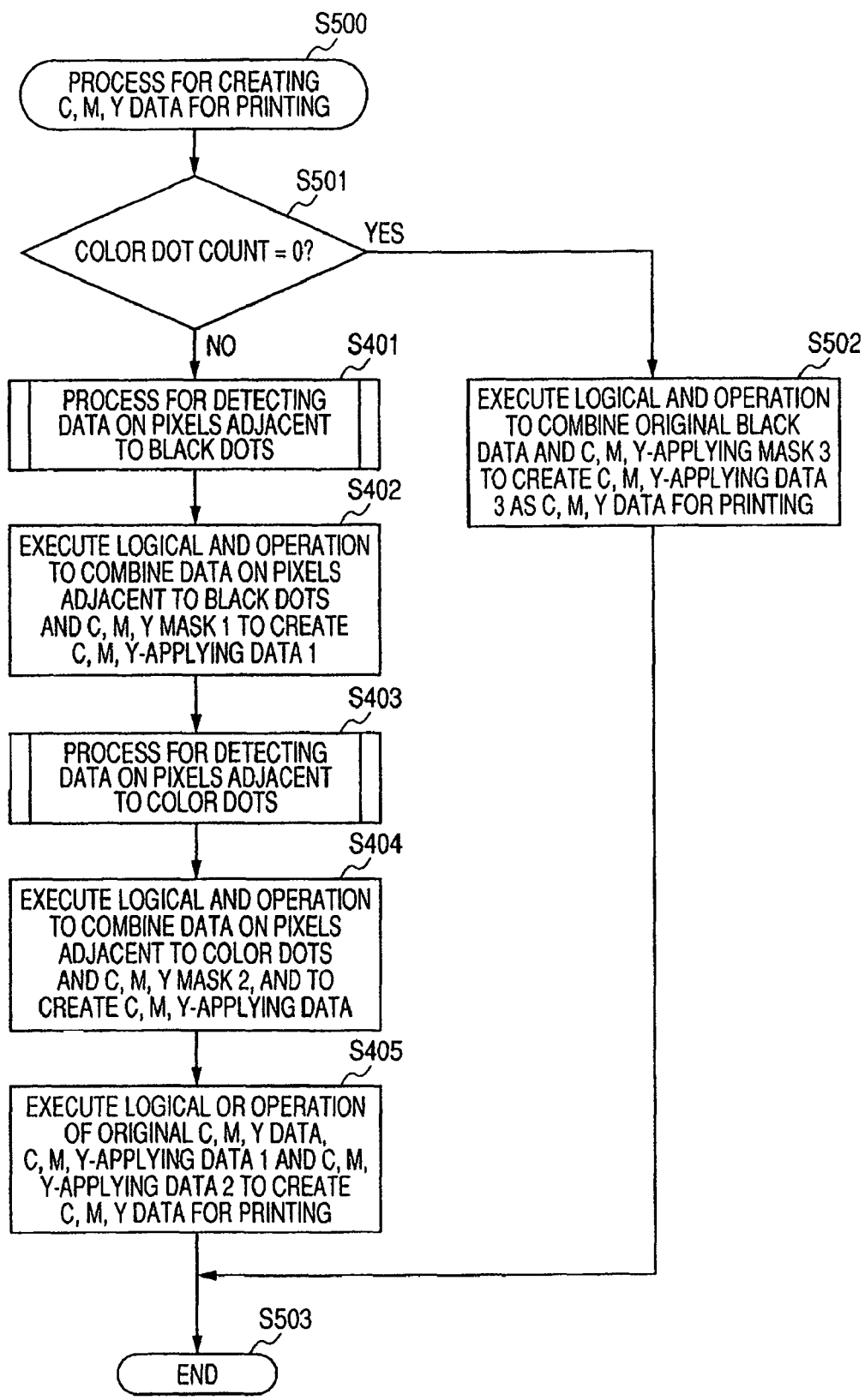
FIG. 15 is a flowchart describing the process of creating color ink printing data over a black image in an embodiment of the present invention.

FIG. 15 is a flowchart of the process of creating color ink printing data in the present embodiment.

In a print mode of recording high-quality black character images, it is determined whether to read Bk, C, M, Y data from memory when the color dot count of the print data is not 0, or to read Bk data alone from memory when the color dot count of the print data is 0 (S501). The process performed when the color dot count of the print data is not 0 is the same as the process shown in FIG. 9. Specifically, data on pixels adjacent to black dots is detected (S401).

Next, the logical products of the data on pixels adjacent to black dots and the masks 1 of cyan, magenta, and yellow are taken to create cyan, magenta, and yellow applying data (S402).

Then, the data on pixels adjacent to color dots is detected (S403), and the logical products of this data and the masks 2 of cyan, magenta, and yellow are taken to create cyan, magenta, and yellow applying data 2 (S404). Finally, the logical sums of the original cyan, magenta, and yellow data, the applying data 1 of each color, and the applying data 2 of each color are taken to create cyan, magenta, and yellow printing data (S405).

Also, when the color dot count of the print data is 0, the process described with reference to FIGS. 14A through 14G is performed. In other words, the logical products of the original black data and the masks 3 of cyan, magenta, and yellow are taken to use the cyan, magenta, and yellow applying data 3 as cyan, magenta, and yellow printing data (S502).

As described above, according to the present embodiment, smearing in high-duty areas can be prevented and high-quality black characters with sharp edge portions can be recorded by applying color dots in black data of relatively high duty, with the exception of the edge areas of the characters, in order to prevent border bleeding and smearing and obtain higher-quality black characters. This is accomplished by determining whether or not the color dot count of the print data is 0, and by switching between reading or not reading color data. Furthermore, high-quality color images with suppressed border bleeding between black and color inks can be recorded by applying color dots with an amount that is different from the amount of applied color dots at which smearing occurs in the border areas between black and color inks. When the objective is to print text and other types of black and-white images at high speed to obtain high-quality black characters, color ink printing data is created from black data, with the result that color dots are applied in the black data, smearing in high-duty areas is prevented, and it is still possible to record high-quality color images with suppressed border bleeding between black and color inks, while the effects are reduced, as compared with the before-mentioned ones.

Embodiment 3

Next, Embodiment 3 of the present invention will be described in detail with reference to the diagrams.

An object of the present embodiment is to further reduce bleeding in the borders of the images in the configuration of Embodiment 1. In the present embodiment, the data that was determined to represent the borders with the color image from among the original black data in the configuration of Embodiment 1 is subjected to a specific amount of thinning.

The process of thinning original black data will now be described with reference to FIGS. 16A through 16F.

Figure 16A:
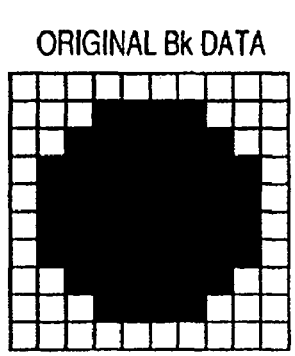
FIGS. 16A, 16B, 16C, 16D, 16E, and 16F are diagrams describing an example of thinning original black data in an embodiment of the present invention.
Figure 16C:
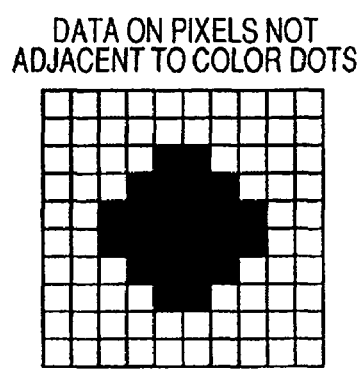
Figure 16E:
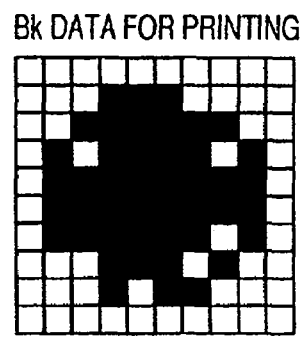
Figure 16B:
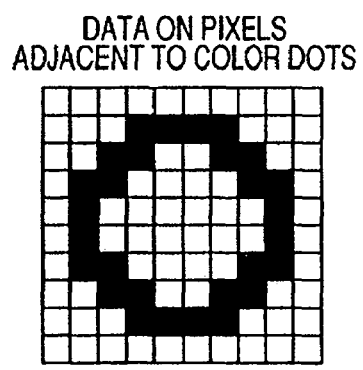

FIGS. 16A through 16F are diagrams describing an example of thinning original black data. FIG. 16A depicts original black data. FIG. 16B depicts data on pixels adjacent to color dots. The same data as in FIG. 4B described in Embodiment 1 is given here as an example of original color data. Therefore, the data on pixels adjacent to color dots determined to represent the borders with the color image are the same as in FIG. 6D.

Figure 16D:
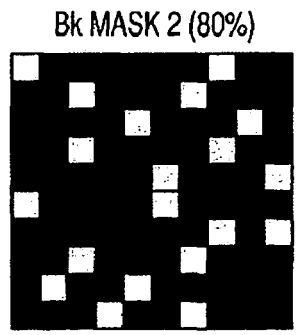
Figure 16F:
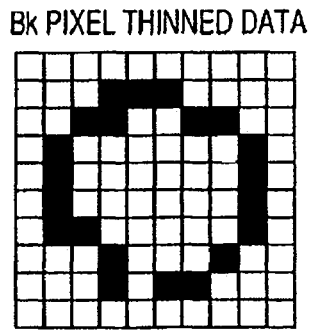

The logical product of the data on pixels adjacent to color dots and the black thinning mask shown in FIG. 16D is taken to create thinned black data such as is shown in FIG. 16F. The black data that is not adjacent to color dots is shown in FIG. 16C. The logical sum of the thinned black data shown in FIG. 16F and the data in FIG. 16C is taken to create the black ink printing data shown in FIG. 16E.

It is possible improve the effects of suppressing bleeding, which readily occurs along the borders of the image, by thinning the black data at the border areas with the color image by a specific amount in this manner.

Also, the smearing-improving effect may be improved by performing a similar thinning process on pixel data in which black dots are adjacent to each other, as shown in FIG. 16C.

In addition to the configuration of Embodiment 1 in which color dots are applied for black images located in the border areas between black and color inks, the present embodiment, as described above, thins the black data corresponding to the border areas between black and color inks, so that it is possible to further suppress bleeding. Also, by thinning both the black data corresponding to the border areas between black and color inks and the data on black pixels not adjacent to color pixels, in addition to the configuration of Embodiment 1, it is possible to suppress smearing and bleeding.

Embodiment 4

Next, Embodiment 4 of the present invention will be described in detail with reference to the diagrams.

In the present embodiment, it is possible to achieve the effects of the previous embodiments and to improve throughput by determining whether or not to implement the process described in the previous embodiments each time an image is recorded by a scan of the carriage.

Figure 17:
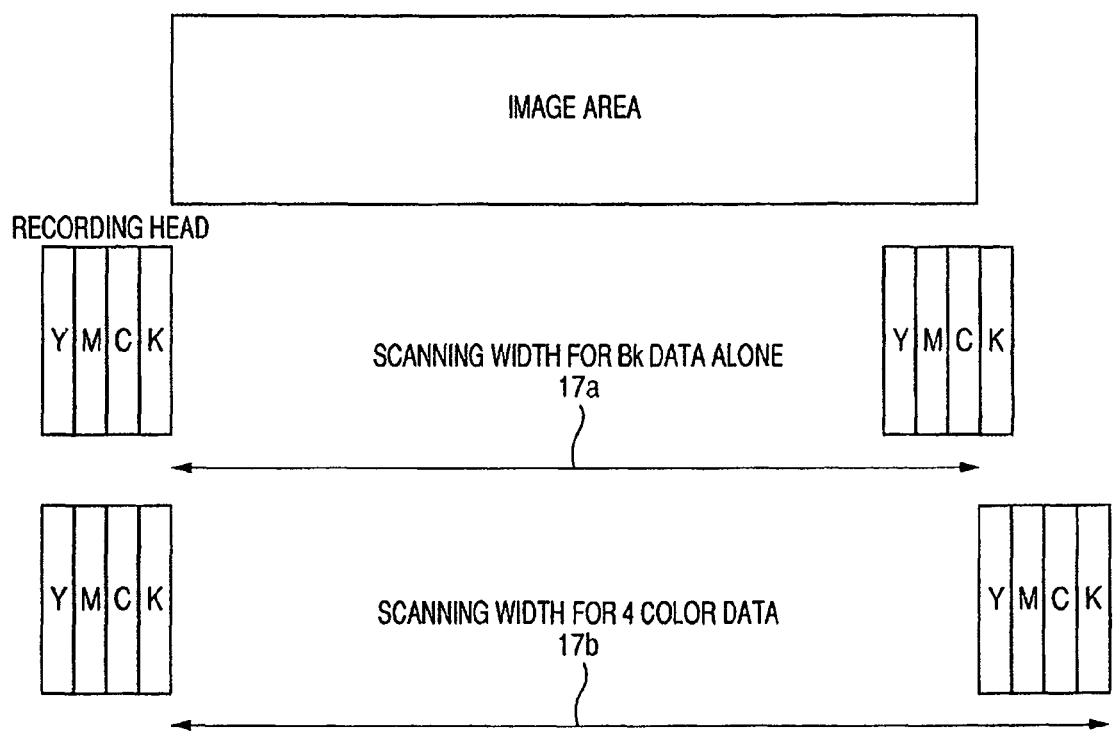
FIG. 17 is a diagram describing the arrangement of the head of each color and the scanning width of the recording head in an embodiment of the present invention.

FIG. 17 is a diagram showing the scanning width of the recording head in a configuration in which the head of each color is arranged along the scanning direction of the recording head. The head corresponding to each color is configured as a chip, and FIG. 17 shows a printer that uses a recording head configured from a horizontal alignment of chips of a plurality of colors.

Generally, in a recording apparatus having a recording head in which heads of black (K), cyan (C), magenta (M), yellow (Y), and other colors are arranged in a horizontal alignment, the scanning width of the carriage is wider when printing with color than when printing with black alone. In other words, when printing with black alone, the recording head need only be scanned proportionate to the scanning distance of the black head over the image area. The scanning width is therefore indicated as 17*a*. However, when recording with four colors, the heads of the four colors must be moved a distance equivalent to the width of the image area. The scanning width in this case is indicated as 17*b*, which is longer than 17*a*. Therefore, the relative throughput is lower when recording with four colors than when recording with black data alone.

Because of these reasons, there is a possibility that throughput will decrease when the processes described in the previous embodiments are implemented, depending on the configuration of the recording head.

In view of this, in the present embodiment, image quality degradation can be prevented and throughput can be improved by detecting the number of dots of each color to be recorded with a single carriage scan in specific size units, and determining whether or not the processes described in the previous embodiments should be implemented according to the detection results.

First, the method of counting dots in the present embodiment will be described.

Figure 18:
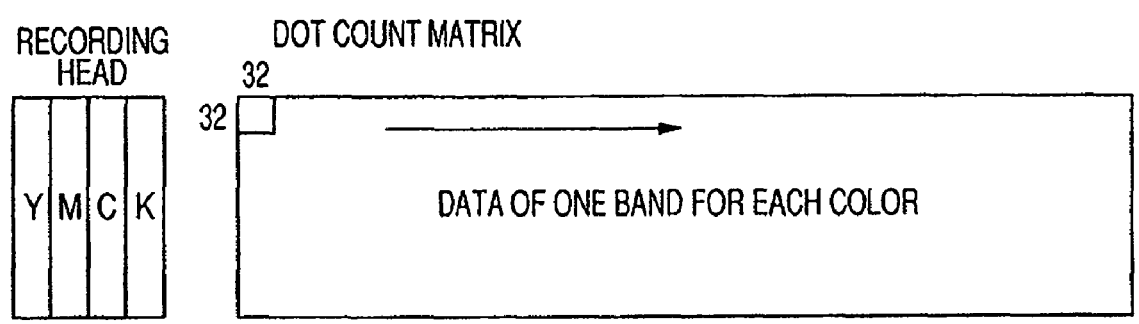
FIG. 18 is a diagram describing the process of counting the data for one scan of each color in an embodiment of the present invention.

FIG. 18 is a diagram describing the method of counting dots in the data that covers a single scan of each color. In the present embodiment, the number of dots to be recorded is counted using a matrix of 32×32 pixels as a single unit in data of each color, and the dots recorded in an area (one band) corresponding to one recording head scan are counted while sequentially shifting the counted area.

Figure 19:
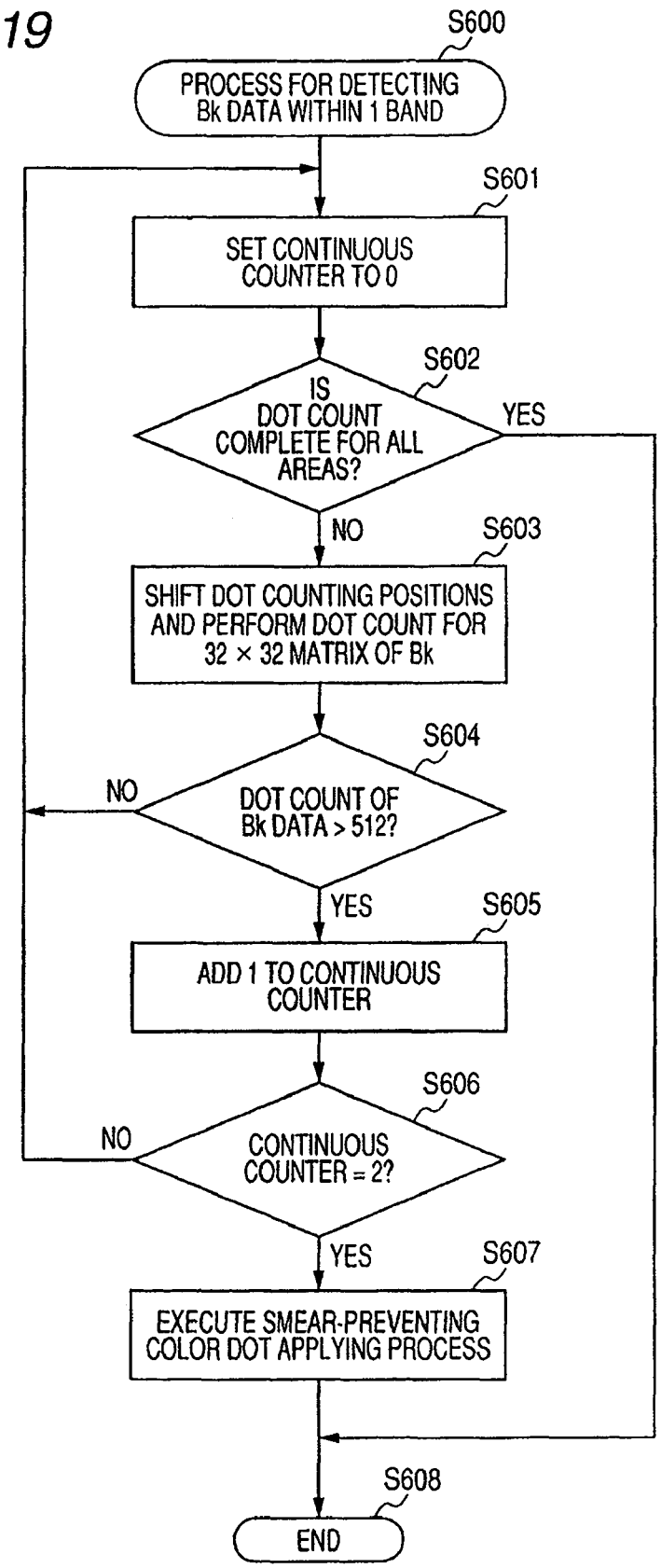
FIG. 19 is a flowchart describing the process of detecting black data in one band in an embodiment of the present invention.

FIG. 19 is a flowchart depicting the process of detecting black data in one band. A continuous counter for determining whether a threshold value has been exceeded continuously is set to 0 (S601). In step S602, it is determined whether the dot count is complete for all areas in one band, and if it is not complete, the process advances to step S603. The dot counting position is shifted to count the dots in another 32×32 matrix (S603). It is then determined whether the dot count exceeds 512 (S604). If so, then 1 is added to the continuous counter (S605). If not, then the continuous counter is set to 0 and the process continues. Next, it is determined whether the continuous counter is at 2 (S606). In step S606, if the continuous count is determined to be 2, then the process advances to step S607, the smear-preventing color dot applying process is implemented, and the flow is ended. If the continuous counter does not reach 2 for any of the areas in one band, the process is ended without color dots being applied.

According to this process, if there is a succession of matrices in which the dot count exceeds the threshold value, color dots are applied in order to prevent smearing. In other words, in the presence of an area in which numerous black dots are applied, color ink is applied in black images in order to prevent smearing because there is a high possibility that problems with smearing will occur because of the presence of black areas with high printing duty.

According to the above process, in bands requiring smearing prevention, it is possible to apply dots of color ink in black images, and also to prevent smearing and to improve throughput.

Next, a configuration will be described in which the number of color dots in one scanning area (one band area) is detected and process implementation is controlled.

Figure 20:
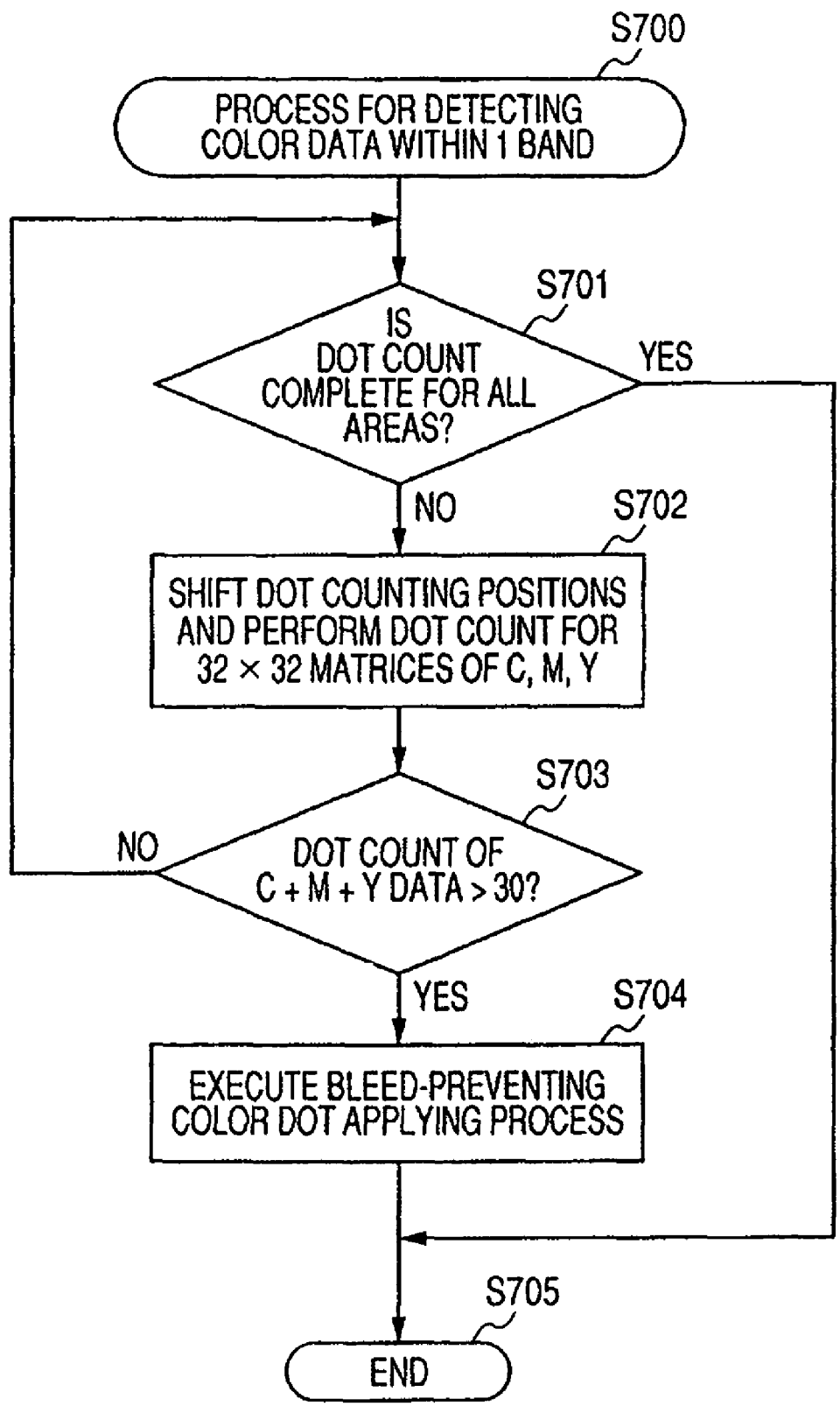
FIG. 20 is a flowchart describing the process of detecting color data in one band in an embodiment of the present invention.

FIG. 20 is a flowchart describing the process of detecting color data in one band. The count is taken for each area of a specific size, and the data is detected while sequentially shifting the counted area, similar to the black dot count described in FIG. 19.

In step S701, it is determined whether the dot count is complete for all areas in one band. If the count is not complete for all areas, the process advances to step S702. In step S702, the area of the dot count is shifted from the previously counted area, and a dot count is taken in 32×32 matrices for cyan, magenta, and yellow. Next, it is determined whether the total dot count for the three colors exceeds 30 (S703). In step S703, if the dot count is determined to exceed 30, the process advances to step S704, the color dots are applied to prevent bleeding in the borders of the image, and the entire process is ended. If the dot count does not exceed 30 in any of the areas in one band, the process is ended without applying the color dots.

In the process in FIG. 20, it is determined whether there are any areas in which color ink has been applied in a relatively large amount, and if there is a high possibility that bleeding will occur in the borders of the image between black and color inks, color ink is applied to prevent bleeding.

According to this process, it is possible to apply color dots in black border portions only when image areas with a possibility of bleeding at the borders of the image are present in one band. Therefore, bleeding at the borders can be prevented, and throughput can be improved.

Embodiment 5

The present embodiment further improves on the problem of smearing by creating data corresponding to pixels not adjacent to black dots (specifically, pixels located at the edge portions of a black image) wherein black dots are not adjacent to each other, and applying color dots in the locations of pixels corresponding to the black edge portions. The specific method is described hereinbelow.

<Creating Pixels Not Adjacent to Black Dots (Black Edge Portions)>

In the present embodiment, pixels adjacent to black dots (pixels having black dots adjacent to the periphery, equivalent to black solid edge portions) are detected in the same manner as in Embodiment 1, and a specific description thereof is omitted.

FIG. 23B depicts data on pixels adjacent to black dots (black solid portions), created from the original black data shown in FIG. 23A. The data corresponding to the black edge portions shown in FIG. 23C is created from the logical product of the original black data shown in FIG. 23A and the data resulting from inversion of FIG. 23B. FIG. 23C depicts data configured from pixels having no black dots in the surrounding pixels. In FIG. 23C, none of the surrounding pixels are black pixels, and they are therefore treated as pixels not adjacent to black dots.

<Creating Color Data Applied in Pixels Not Adjacent to Black Dots (Bk Edge Portions)>

Figure 24A:
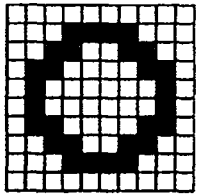
FIGS. 24A, 24B, 24C, 24D, 24E, 24F, 24G, 24H, 24I, and 24J are diagrams describing the creation of data on color dots applied in black edge portions in an embodiment of the present invention.

FIG. 24A corresponds to FIG. 23C, and depicts pixels corresponding to the edge portions of the original data in FIG. 23A.

Figure 24B:
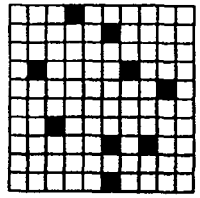
Figure 24E:
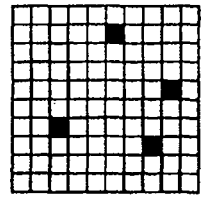
Figure 24H:
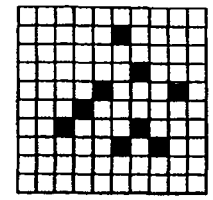
Figure 24C:
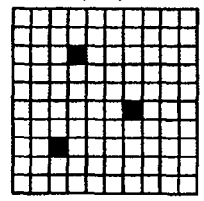
Figure 24F:
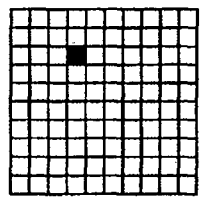
Figure 24I:
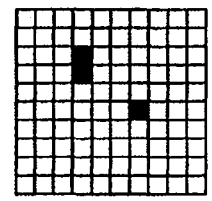
Figure 24D:
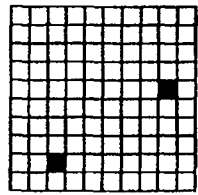
Figure 24G:
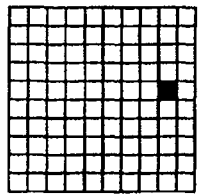

FIGS. 24B, 24C, and 24D depict masks used to create data on color ink applied in the black edge portions. FIG. 24B depicts a mask for creating data for cyan ink, and FIGS. 24C and 24D depict masks for creating data for magenta and yellow ink, respectively. The data in FIGS. 24E, 24F, and 24G can be created by taking the logical products of the data in FIG. 24A and the masks corresponding to each color. FIGS. 24E, 24F, and 24G respectively depict cyan, magenta, and yellow data applied in black edge portions.

Figure 24J:
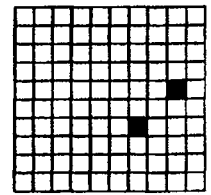

The data on color ink applied in the black solid portions is created in the same manner as is described in Embodiment 1 with reference to FIGS. 7A though 7G. Therefore, the data on color ink applied over black ink images is a combination of the data on each color shown in FIGS. 7E, 7F, and 7G, and the data on each color shown in FIGS. 24E, 24F, and 24G. Therefore, the data on cyan ink applied in black images produces the dot locations shown in FIG. 24H. The drawing depicts the results of the logical sum of the data shown in FIGS. 7E and 24E. Similarly, the data on magenta ink is the logical sum of the data shown in FIGS. 7F and 24F, and the dot locations are as shown in FIG. 24I. Also, the data on yellow ink is the logical sum of the data shown in FIGS. 7G and 24G, and the dot locations are as shown in FIG. 24J.

The ratio of color dots of each color applied in the black solid portions (the portions configured from pixels not adjacent to pixels other than black pixels) is 18% cyan, 6% magenta, and 5% yellow. The ratio of color dots of each color applied in the black edge portions is 9% cyan, 3% magenta, and 2.5% yellow, and the ratio at which color ink is applied in the black edge portions is set to less than the ratio for the solid portions. Setting the applying ratios in this manner makes it possible to ensure sharpness in the edge portions of black images, and to minimize degradation of black character image quality.

The smearing-preventing effect can be improved by applying color dots in the black edge portions as described above. Furthermore, degradation of black character quality can be prevented by setting the amount of color ink applied in the black edge portions to be less than in the black solid portions.

Embodiment 6

Next, Embodiment 6 of the present invention will be described with reference to the diagrams.

The present embodiment involves a configuration for applying color ink dots in black edge portions, wherein a color conversion process implemented in image processing is utilized.

Common printers use cyan, magenta, yellow, and black ink. The image data processed by a computer and the signals used when the data is displayed on a monitor by a computer are displayed in the three basic colors RGB (red, green, and blue), and a color conversion process is therefore performed when the data or signals are outputted by a printer.

In the present embodiment, in a color conversion process of converting RGB data to CMYK (cyan, magenta, yellow, and black) data, black data in which R, G, and B are all "0" is converted to non-black C, M, and Y data. Therefore, when the color information before conversion, as expressed by RGB, indicates black, dots of color ink can be applied in a black image by creating data that corresponds to black ink and other color inks.

In the present embodiment, when R, G, and B all indicate "0" as previously described, 9% cyan, 3% magenta, and 2.5% yellow are created. After the C, M, Y, and K data thus created are all binarized, the solid portions are extracted from the black data. Data on color ink to be applied in the solid portions is created for these extracted black solid portions. The data on color ink to be applied in black solid portions can be created by utilizing the masks for each color in the solid portions, similar to the previous embodiments. Therefore, both bleeding and smearing can be reduced in the same manner as in the previous Embodiment 5 by adding and applying dots of color ink corresponding to a ratio of 9% cyan, 3% magenta, and 2.5% yellow to the black solid portions.

Next, the process of creating recording data in the present embodiment will be described.

Figure 25:
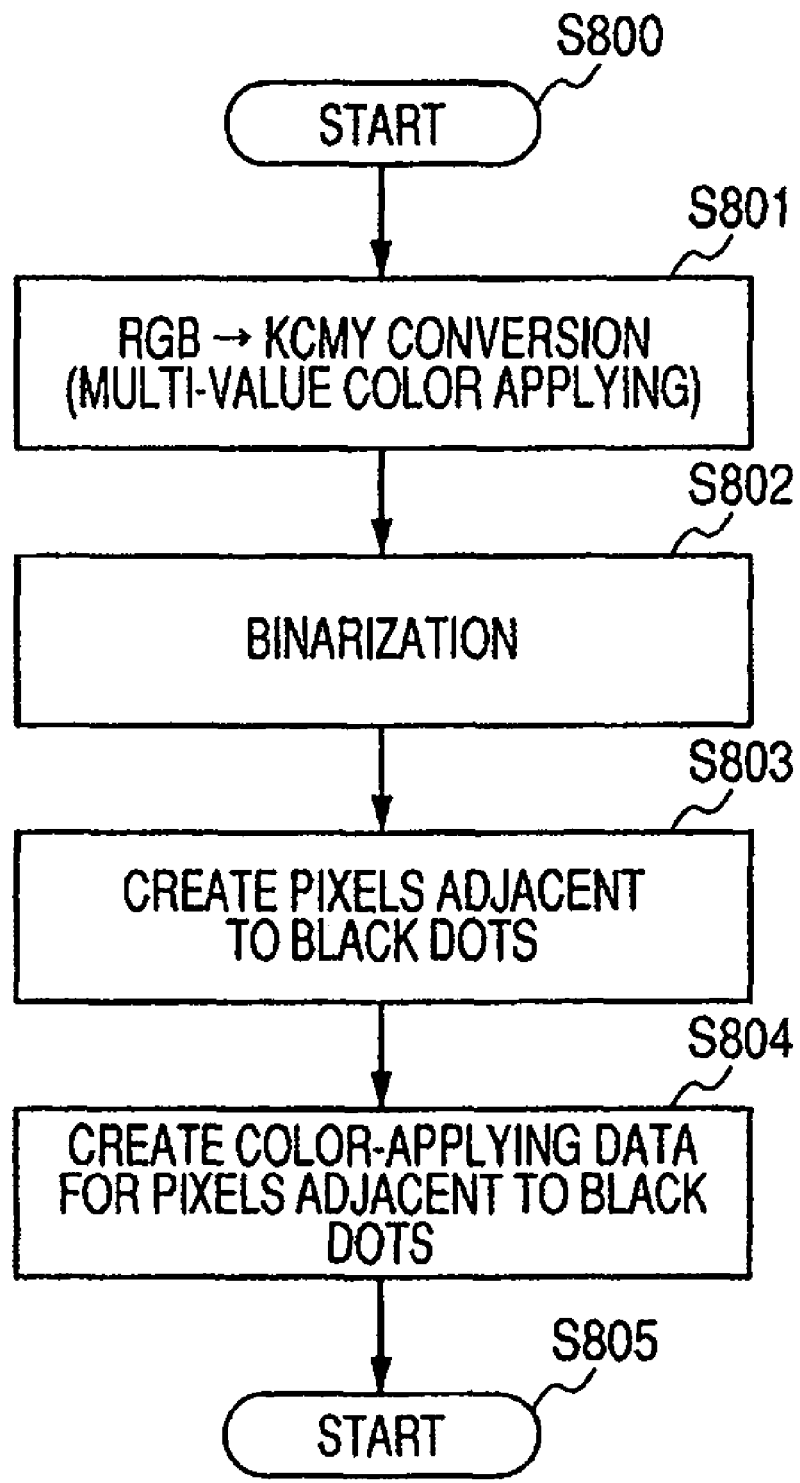
FIG. 25 is a flowchart describing the process of creating data on color dots applied for a black image in an embodiment of the present invention.

FIG. 25 is a flowchart describing the process of the present embodiment.

In the present embodiment, a three-dimensional LUT table is used to convert RGB data to CMYK data. The value (signal value) of the data of each color is assumed to be 8 bits. When data expressing black with RGB (R=G=B=0) is inputted, the values of the LUT table are set so that the converted signal values of K, C, M, and Y are K=255, C=23 (255×0.09≈23), M=8 (255×0.03≈8), and Y=6 (255×0.025≈6). After the conversion (step S801) with this LUT table is performed, the binarization shown in step S802 is performed. As a result of the process in steps S801 and S802, color dots of a ratio of 9% cyan, 3% magenta, and 2.5% yellow for 100% black are applied irrespective of the pixels that are adjacent to black dots (black solid portions) and the pixels that are not adjacent to black dots (black edge portions). Next, data corresponding to the black solid portions is created by step S803. Then, masks are used to apply color dots in the black solid portions at a ratio of 9% cyan, 3% magenta, and 2.5% yellow, and color dot data is created (S804).

Both the color dots applied by the color conversion process in step S801 and the color dots applied by the masking of the binarized black data are applied in the black solid portions. As a result, color dots for each color are applied at a ratio of about 18% cyan, about 6% magenta, and about 5% yellow for the black solid portions. On the other hand, only the color dots created in the color conversion process are applied in the Bk edge portions. In other words, color dots are applied in the edge portions at a ratio of about 9% cyan, about 6% magenta, and about 2.5% yellow.

According to the method described above, it is possible to improve the effects of preventing bleeding and smearing by applying color dots in black edge portions. Furthermore, degradation of black character quality can be prevented by reducing the amount of color dots applied in the black edge portions to be less than the amount of color dots applied in the black edge portions.

Embodiment 7

Next, the seventh embodiment of the present invention will be described.

In the present embodiment, recorded black pixels are thinned in the edge portions and solid portions of black images, and color ink is applied in the edge portions of black images for printing.

Specifically, in the present embodiment, the amount of dots thinned in the black edge portions is less than in the black solid portions. Furthermore, the amount of color ink applied in the black edge portions after the thinning process is less than the amount of color ink applied in the black solid portions after the thinning process. High-quality black characters can be recorded with this configuration.

The specific method is described hereinbelow.

<Creating Black Recording Data>

Figure 26A:
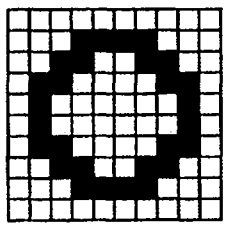
FIGS. 26A, 26B, 26C, 26D, 26E, 26F, and 26G are diagrams describing a method of creating black data in an embodiment of the present invention.

First, the processing of black recording data will be described. In the present embodiment, original data of a black image is used as the dot arrangement data shown in FIG. 23A, similar to the previous embodiment. FIG. 26A shows a dot arrangement obtained by detecting the border portions of a black image from the original black data. Also, FIG. 26D shows a dot arrangement of a black solid portion obtained by detection based on the original black data. The detection process for these edge and solid portions can be performed by using the various methods described in the previous embodiments, and therefore specific descriptions thereof are omitted.

Figure 26B:
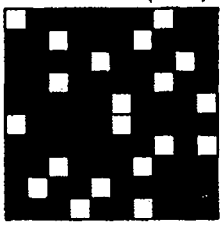
Figure 26C:
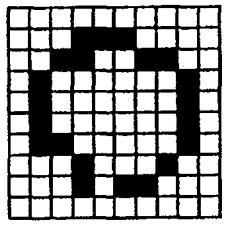

The black edge portions shown in FIG. 26A are subjected to thinning using the mask pattern (black mask 2 for thinning) shown in FIG. 26B. The thinning process is performed herein by taking the logical product of the patterns in FIGS. 26A and 26B. FIG. 26C depicts black data after the thinning process.

Figure 26G:
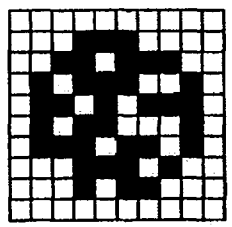
Figure 26D:
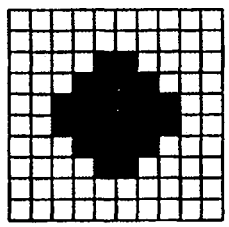
Figure 26E:
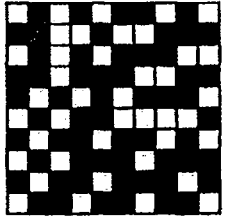
Figure 26F:
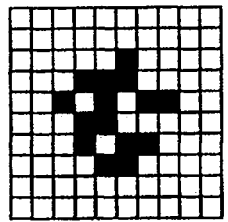

The black solid portions are subjected to thinning by the mask pattern (black mask 3 for thinning) shown in FIG. 26E. The thinning process can be accomplished with the logical product of the two patterns, similar to the process for the edge portions. FIG. 26F shows a black dot arrangement following the thinning of the solid portions.

The mask 2 used in the thinning of the edge portions results in a ratio of 20% of the dots being thinned and 80% of the dots being recorded. The mask 3 used in the thinning of the solid portions ensures that 40% of the dots are thinned and 60% of the dots are recorded. Thus, degradation in the quality of black characters can be prevented by setting different ratios for the dots constituting the black image in the edge portions and the solid portions, and reducing the amount of thinning in the edge portions to be less than that of the solid portions.

The ultimately recorded black recording data yields the dot pattern shown in FIG. 26G, which is obtained from the logical sum of the data in FIGS. 26C and 26F.

<Creating Color applying Data>

In the present embodiment, the data for recording color dots applied in black images employs the method described in Embodiment 5 or 6.

As described above, high-quality black characters can be recorded by thinning the edge portions and solid portions of black images using masks having different thinning ratios, and by reducing the amount of color ink applied in black images to be less in the edge portions than in the solid portions.

Embodiment 8

Next, the eighth embodiment of the present invention will be described.

In the present embodiment, data on color dots applied in black images is created using the method in Embodiment 6 previously described. Specifically, in the process of converting RGB data to CMYK data, data on color ink recorded over a black image can be created by converting RGB data that expresses black to create data on each color along with black data. In the present embodiment, furthermore, pixels adjacent to black dots (specifically, black solid portions) are detected, the pixels corresponding to the solid portions are thinned using a specific mask, and then the data is combined with data corresponding to the edge portions of the black image. The combined black data is then uniformly thinned.

Figure 27:
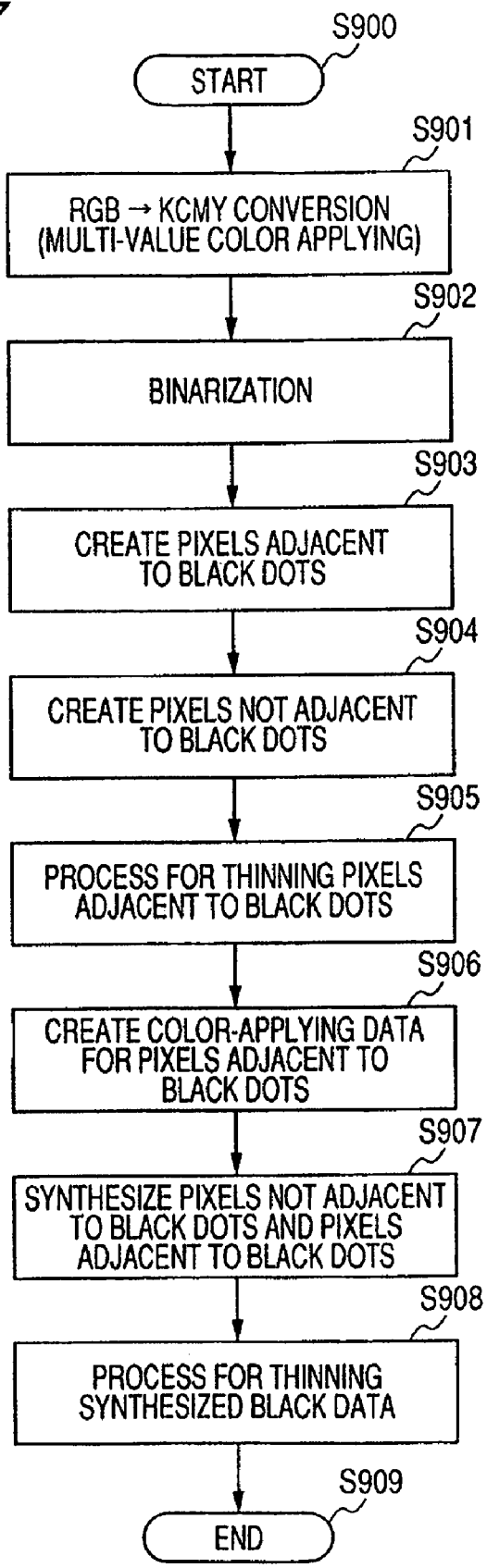
FIG. 27 is a flowchart describing the process of creating black data and data of color dots applied for a black image in an embodiment of the present invention.

The specific process is described hereinbelow with reference to the flowchart shown in FIG. 27.

First, color data expressed as multi-value data is created in a process of converting RGB data to CMYK data (S901), similar to Embodiment 6. The multi-value color data thus created is data on color dots applied in black images. Next, a binarization process (S902) of converting multi-value data to binary data is performed. After the binarization process, data corresponding to the solid portions of the black image is created (S903), and data corresponding to the edge portions of the black image is created (S904). Then, in step S905, the black solid portions are subjected to thinning. Data corresponding to the color ink dots to be applied in the black solid portions is subsequently created (S906). Next, the data corresponding to the black edge portions and the data on the black solid portions after the thinning process are combined (S907). This combination process can be performed using the logical sum of the two groups of data.

Then, the combined data obtained in step S907 is uniformly thinned (S908) using a mask for the thinning process, and the final black recording data is created.

The thinning pixels adjacent to black dots (black solid portions) in step S905 is performed using a mask with 80% duty. Also, a mask with 75% duty is used for the mask in the thinning process in step S908, which is performed on the black data resulting from the combining of data in step S907. Therefore, the solid portions are subjected first to 20% thinning in step S905, and then to 25% thinning in step S908. The edge portions of the black image are subjected only to 25% thinning in step S908. In other words, the thinning process is performed at different ratios for the edge portions and the solid portions of the black image. Specifically, the solid portions of the black image are thinned so as to achieve 60% (0.8×0.75=0.6) duty for the original data, and the edge portions of the black image are thinned so as to achieve 80% duty for the original data.

High-quality black characters can be recorded by the method described above.

Other Embodiments

In Embodiment 1, detection of objective pixels for which color dots are applied was described with reference to FIGS. 3 through 6D. Detection of objective pixels in the present invention is not limited to the configuration previously described. In other words, the method described below may be used to simplify the process described in Embodiment 1.

Detection of objective pixels for which color dots are applied in order to prevent smearing is described with reference to FIGS. 21A through 21D. The original black data in FIG. 21A is described as the same type of data as that depicted in FIG. 4A above.

Figure 21A:
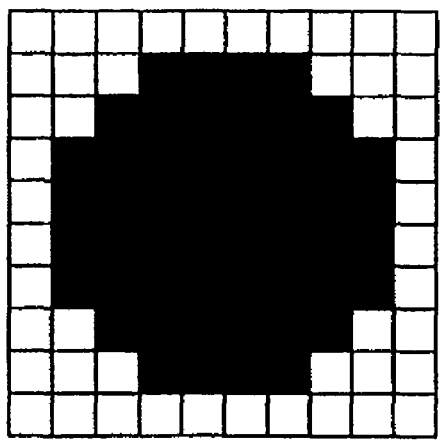
FIGS. 21A, 21B, 21C, and 21D are diagrams describing the process of detecting pixels in which color dots will be applied to prevent smearing in an embodiment of the present invention.
Figure 21B:
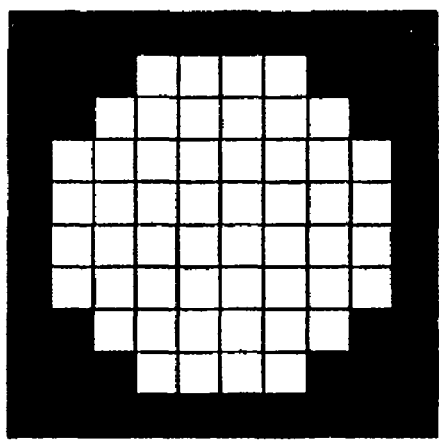
Figure 21C:
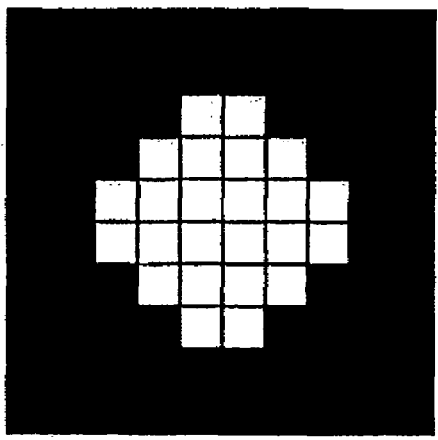

First, data (FIG. 21B) is created by inverting the original black data shown in FIG. 21A. Furthermore, the data in FIG. 21B is set in bold by a specific number of pixels in eight proximal directions to create the data shown in FIG. 21C. The data shown in FIG. 21C is again inverted to obtain the data shown in FIG. 21D. The data shown in FIG. 21D constitutes pixels to which black dots are adjacent. The term "inverted" as used in the process refers to the process of converting pixels for recording into non-recording pixels, and non-recording pixels into pixels for recording. The absence or presence of recording can be expressed using one-bit data, normally "0" or "1". Therefore, the process of inversion need only involve conversion from "0" to "1" and from "1" to "0", whereby the process can be simplified and accelerated.

Figure 21D:
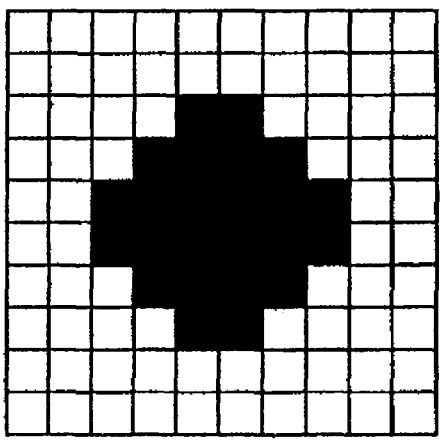

In the process described with reference to FIGS. 3 and 4A through 4C, an objective pixel is determined according to whether or not nine black dots were present in a 3×3 matrix. Setting one pixel in bold in each of the eight proximal directions as shown in FIG. 21D makes it possible to obtain the same results as when pixels to which black dots are adjacent are identified in the case in which the objective pixel and the surrounding nine dots are black dots in Embodiment 1.

Next, the process of detecting objective pixels for applying color dots in order to prevent bleeding in the borders of an image will be described with reference to FIGS. 22A through 22D.

In FIGS. 22A through 22D, the original black data is described as the same pattern as in FIGS. 4B and 6B described in Embodiment 1.

Figure 22A:
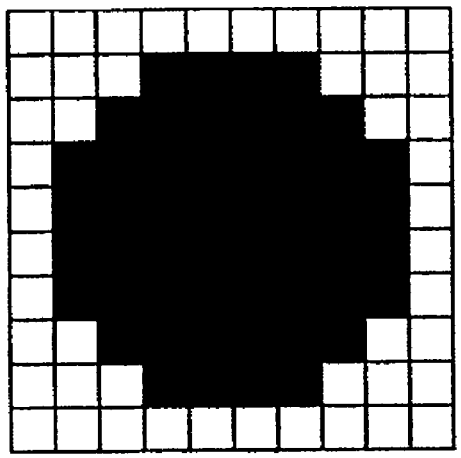
FIGS. 22A, 22B, 22C, and 22D are diagrams describing the process of detecting pixels in which color dots will be applied to prevent bleeding in an embodiment of the present invention.
Figure 22B:
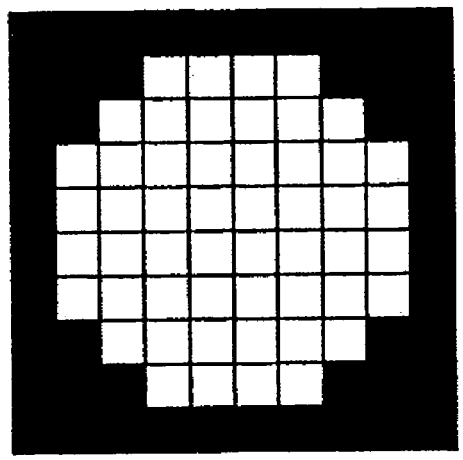
Figure 22C:
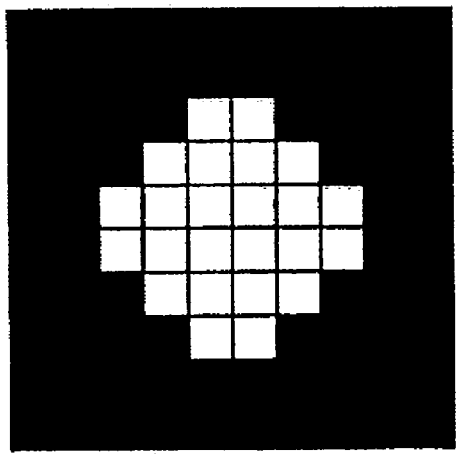
Figure 22D:
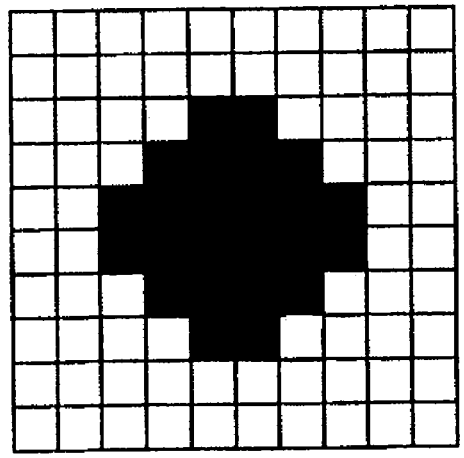

FIG. 22B depicts original color data. Data (FIG. 22C) is created by setting the color data in FIG. 22B in bold for a specific number of pixels in eight directions. To concentrate only on the illustrated range, FIG. 22C depicts a state in which the data has been set in bold in the direction of the non-recording pixels on the inside of FIG. 22B. In this case, data in which only a single-pixel area is bolded is used to determine the one-pixel area that will form the border. Data resulting from the logical product of the data in FIG. 22C and the original black data shown in FIG. 22A produces the pattern shown in FIG. 22D. The data shown in FIG. 22D indicates pixels of the black data that are adjacent to color dots.

In Embodiment 1, black dots are used as objective pixels, and the objective pixels are determined to be pixels adjacent to color dots when even only one color dot is present in a 3×3 matrix.

In the process shown in FIGS. 22A through 22D, the same effects as in Embodiment 1 can be obtained by setting the color data shown in FIG. 22B in bold by one pixel in eight directions.

Color inkjet printers that use a black ink and a plurality of other color inks are also known to have a configuration designed to use ink with relatively low permeability on recording mediums as black ink, and ink with relatively high permeability on recording mediums as color ink. In color inkjet printers that use inksets of different permeability, when the color ink and the black ink are printed and overlapped at the same location, ejecting the color ink first and then ejecting the black ink over the dots of color ink yields greater effects of smearing prevention. This is a result of the fact that continuing to eject ink onto the surface of paper through which ink has already permeated accelerates the permeation of the subsequently ejected ink into the recording medium. In view of this, when dots of color ink are applied in a black image in order to reduce smearing and bleeding, greater effects can be achieved by recording the color ink prior to the black ink. In the case of a serial printer such as is shown in FIG. 10, the sequence of black ink and color ink can be kept constant by restricting the scanning direction to a specific direction when printing is performed as the recording head is scanning the paper.

Also, in the configuration in Embodiment 4, since the scanning width increases due to the use of color ink heads for recording, it is possible to design the configuration so that color dots are applied only when the conditions for applying color dots in the area of the increased scanning width have been fulfilled.

This application claims priorities from Japanese Patent Application Nos. 2003-383367 filed on Nov. 13, 2003, and 2004-322258 filed on Nov. 5, 2004, which are hereby incorporated by reference herein.

The invention claimed is:

1. A recording apparatus that uses an ink-ejecting recording head and performs recording by ejecting black ink and at least one color ink onto a recording medium from the recording head, comprising:

extraction means for extracting, on the basis of recording data, both black adjacent pixels composed of pixels whose adjacent pixels are recorded with black ink, and color adjacent pixels that include pixels whose adjacent pixels are recorded with color ink, from among the pixels constituting a black image;

data creating means for creating data that corresponds to color ink so that recording with black ink and with color ink applied (or added) according to a given ratio is done, on the black adjacent pixels or the color adjacent pixels extracted by the extraction means; and recording control means for performing recording with the recording head on the basis of the recording data and the data created by the data creating means, wherein the black image is recorded by superposing an image composed of pixels formed by black ink and an image based on the data corresponding to color ink created by the data creating means, and the data creating means creates data that corresponds to color ink by increasing the ratio for recording pixels with color ink onto the black adjacent pixels to be greater than the ratio for recording pixels with color ink onto the color adjacent pixels.

2. The recording apparatus according to claim 1, wherein the creating means creates, as data corresponding to the color ink, data obtained by using a mask pattern for creating pixels recorded according to a given ratio and processing the black adjacent pixels or the color adjacent pixels.

3. The recording apparatus according to claim 2, wherein the creating means creates data that corresponds to color ink, based on the logical product of the mask pattern and either the black adjacent pixels or the color adjacent pixels.

4. The recording apparatus according to claim 1, wherein the creating means creates, as data corresponding to the color ink, data obtained by using a mask pattern for creating pixels recorded according to a given ratio and processing the black adjacent pixels or the color adjacent pixels, and uses different masking ratios for the mask patterns used in the masking of the black adjacent pixels and the color adjacent pixels.

5. The recording apparatus according to claim 4, wherein a plurality of color inks corresponding to different colors are used as the color ink; and the creating means uses the mask patterns corresponding to the plurality of color inks to create data corresponding to the plurality of color inks.

6. The recording apparatus according to any one of claims 1 to 4, and 5, wherein the recording control means records by ejecting black ink according to data that corresponds to black ink, and also records by ejecting color ink according to data obtained from the logical sum of data that corresponds to color ink in the recording data and data that corresponds to color ink created by the creating means.

7. The recording apparatus according to claim 1, wherein the extraction means extracts objective pixels as black adjacent pixels when there is more than a predetermined number of black pixels in a matrix which is composed of L×M (where L and M are integers expressed by 1, 3, 5, ... n, n+2, and where n is a positive integer) pixels and in which pixels constituting a black image are centered around the objective pixels.

8. Recording apparatus according to claim 1, wherein the extraction means extracts objective pixels as color adjacent pixels when there is more than a predetermined number of color dot pixels in a matrix composed of L×M (where L and M are integers expressed by 1, 3, 5, ... n, n+2, and where n is a positive integer) pixels and in which pixels constituting a black image are centered around the objective pixels.

9. The recording apparatus according to claim 1, further comprising thinning means for thinning black ink data from among the recording data;
Wherein the recording control means performs recording with black ink in accordance with the black ink data that has been thinned by the thinning means.

10. The recording apparatus according to claim 9, wherein the thinning means uses different ratios of thinning black ink data for the black adjacent pixels and the color adjacent pixels.

11. The recording apparatus according to claim 1, wherein when data that corresponds to color ink is not included in the recording data, extraction by the extraction means is not performed, and data that corresponds to color ink is created so that pixels are recorded with color ink at a predetermined ratio on an image recorded with data that corresponds to black ink.

12. The recording apparatus according to claim 1, further comprising scanning means for scanning the recording head relative to the recording medium; and determination means for determining whether extraction by the extraction means and creation of data that corresponds to color ink by the creation means are performed in each scanning area in which recording is carried out by causing the recording head to perform a single scan with the scanning means, on the basis of recording data included in the scanning areas; wherein the choice of whether or not extraction by the extraction means and creation of data that corresponds to color ink by the creation means are performed is controlled according to the determination results from the determination means.

13. The recording apparatus according to claim 12, wherein the scanning direction when recording is performed during scanning with the scanning means is determined so that recording with color ink is performed prior to recording with black ink.

14. A data processing method for processing recording data in a recording apparatus that uses an ink-ejecting recording head and performs recording by ejecting black ink and at least one color ink onto a recording medium from the recording head, comprising:
an extraction step for extracting, on the basis of data for recording, both black adjacent pixels composed of pixels whose adjacent pixels are recorded with black ink, and color adjacent pixels that include pixels whose adjacent pixels are recorded with color ink, from among the pixels constituting a black image;
a data creating step for creating data that corresponds to color ink so that recording with black ink and with color ink applied (or added) according to a given ratio is done, on the black adjacent pixels or the color adjacent pixels extracted in the extraction step; and
a recording control step for performing recording with the recording head on the basis of the recording data and the data created in the data creating step,
wherein the black image is recorded by superposing an image composed of pixels formed by black ink and an image based on the data corresponding to color ink created in the data creating step, and
the data creating step creates data that corresponds to color ink by increasing the ratio for recording pixels with color ink onto the black adjacent pixels to be greater than the ratio for recording pixels with color ink onto the color adjacent pixels.

* * * * *